US012624236B2

(12) United States Patent
Matsumoto et al.

(10) Patent No.: US 12,624,236 B2
(45) Date of Patent: May 12, 2026

(54) INKJET INKS FOR OPAQUE PRINTED IMAGES

(71) Applicant: KAO CORPORATION, Tokyo (JP)

(72) Inventors: Yuta Matsumoto, Cincinnati, OH (US); Tomohide Yoshida, Wakayama (JP)

(73) Assignee: KAO CORPORATION, Tokyo (JP)

( * ) Notice: Subject to any disclaimer, the term of this patent is extended or adjusted under 35 U.S.C. 154(b) by 239 days.

(21) Appl. No.: 18/254,955

(22) PCT Filed: Mar. 31, 2021

(86) PCT No.: PCT/US2021/025065
§ 371 (c)(1),
(2) Date: May 30, 2023

(87) PCT Pub. No.: WO2022/211799
PCT Pub. Date: Oct. 6, 2022

(65) Prior Publication Data

US 2024/0018375 A1 Jan. 18, 2024

(51) Int. Cl.

| | |
|---|---|
| ***C09D 11/36*** | (2014.01) |
| ***B41J 2/01*** | (2006.01) |
| ***B41J 2/21*** | (2006.01) |
| ***B41J 11/00*** | (2006.01) |
| ***B41M 5/50*** | (2006.01) |
| ***C09D 11/102*** | (2014.01) |
| ***C09D 11/104*** | (2014.01) |
| ***C09D 11/108*** | (2014.01) |
| ***C09D 11/322*** | (2014.01) |
| ***C09D 11/38*** | (2014.01) |

(52) U.S. Cl.
CPC ................. *C09D 11/36* (2013.01); *B41J 2/01* (2013.01); *B41J 2/2107* (2013.01); *B41J 11/0021* (2021.01); *B41M 5/502* (2013.01); *C09D 11/102* (2013.01); *C09D 11/104* (2013.01); *C09D 11/108* (2013.01); *C09D 11/322* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | | |
|---|---|---|---|---|
| 2012/0232206 A1* | 9/2012 | Wu | C09D 11/322 | 977/773 |
| 2013/0035428 A1* | 2/2013 | Carlini | C09D 11/38 | 524/95 |
| 2013/0099179 A1* | 4/2013 | Vanheusden | H01B 1/02 | 977/773 |
| 2016/0222229 A1* | 8/2016 | Yamada | C09D 11/322 | |
| 2016/0272827 A1* | 9/2016 | Goustiaux | C09D 11/102 | |
| 2018/0291217 A1* | 10/2018 | Kagata | C09D 11/322 | |
| 2022/0049118 A1* | 2/2022 | Matsumoto | C09D 11/36 | |
| 2023/0312952 A1* | 10/2023 | Matsumoto | C09D 11/38 | 524/280 |
| 2023/0312964 A1* | 10/2023 | Matsumoto | C09D 11/32 | 347/100 |
| 2024/0076513 A1* | 3/2024 | Matsumoto | C09D 11/033 | |

FOREIGN PATENT DOCUMENTS

| | | | |
|---|---|---|---|
| CA | 2394641 C * | 4/2005 | C09B 67/0085 |
| WO | WO 2020/112127 A1 | 6/2020 | |

OTHER PUBLICATIONS

International Search Report & Written Opinion issued Jun. 4, 2021 in PCT/US2021/025065, filed on Mar. 31, 2021, 8 pages.

* cited by examiner

*Primary Examiner* — Manish S Shah
(74) *Attorney, Agent, or Firm* — Oblon, McClelland, Maier & Neustadt, L.L.P.

(57) ABSTRACT

An inkjet ink, including (A) a resin, which is (A1) a terpene resin or (A2) a terpene phenol resin, (B) a solvent system including (B1) a volatile organic solvent having a boiling point of less than 100° C., and (C) silver nanoparticles. A printed article, including a substrate, and an opaque film disposed on the substrate. The opaque film is formed from the inkjet ink.

19 Claims, No Drawings

INKJET INKS FOR OPAQUE PRINTED IMAGES

CROSS REFERENCE TO RELATED APPLICATIONS

This application is a National Stage entry under 35 U.S.C. § 371 of PCT/US2021/025065, filed on Mar. 31, 2021. The entire contents of which are incorporated herein by reference.

BACKGROUND OF THE INVENTION

Field of the Invention

The present invention relates to inkjet inks, specifically inkjet inks that include (A) a resin, which is (A1) a terpene resin or (A2) a terpene phenol resin; (B) a solvent system containing (B1) a volatile organic solvent having a boiling point of less than 100° C.; and (C) silver nanoparticles.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Thermal inkjet (TIJ) printing is a desirable technology for printing, coding, and marking as it offers high print resolutions at lower costs than competing technologies in the field, such as continuous inkjet methods. In thermal inkjet printing processes, the print cartridges contain a series of tiny chambers, each containing a heater, which produce ink droplets from thermal vaporization of an ink solvent. In the jetting process, a resistor is heated rapidly to produce a vapor bubble (hence the phrase "bubble jet"), which subsequently ejects a droplet from the orifice. This process is extremely efficient and reproducible and modern TIJ printheads for industrial graphics applications are capable of generating uniform drops of 4 pL or smaller in volume at frequencies of 36 kHz or greater.

Yet, providing readable images on dark colored substrates poses a significant challenge for inkjet ink printing. Traditionally, opaque pigmented inks (e.g., white or yellow pigmented inks) have been used to provide contrast on dark colored substrates. The pigments used in these inks, such as titanium oxide, need to be of large particle size on the order of about 200 nm or larger, and must be applied to the dark surface in high density to achieve adequate legibility (i.e., adequate opacity). As a result, opaque pigmented inks are prone to settling, leading to poor shelf-life, clogging of the inkjet nozzles, and defective jetting. Opaque pigmented inkjet inks thus typically require inkjet printers fitted with a mechanical mechanism (e.g., shaking or stirring mechanisms) for keeping the pigment suspended throughout the printing operation.

The open atmosphere print head design (the nozzle orifices are open to atmosphere and there is no valve seal at the orifice to allow ink pressurization) of thermal inkjet printheads further exacerbates the issue of nozzle clogging, where decap time (print idle time) causes premature drying of ink in and around the nozzles. Solvent losses due to prolonged exposure to air within an uncapped printhead results in clogging/plugging of printhead nozzles and unreliable ink jetting and image quality erosion over time.

SUMMARY OF THE INVENTION

In view of the forgoing, there is a need for inkjet inks that are capable of providing legible (opaque) images on dark colored substrates, perform under extended decap conditions, and have robust running stability—i.e., are not prone to settling during printing operations-without the need for special mechanical mechanisms for achieving adequate particle suspension.

Accordingly, it is one object of the present invention to provide novel inkjet inks that meet these criteria.

It is another object of the present disclosure to provide novel printed articles which contain an opaque film, formed from the inkjet inks, disposed on a substrate.

It is another object of the present disclosure to provide novel methods of forming an opaque printed image on a substrate by applying the inkjet inks onto the substrate and drying the inkjet ink, thereby converting the inkjet ink into an opaque film forming the opaque printed image.

These and other objects, which will become apparent during the following detailed description, have been achieved by the inventors' discovery that silver nanoparticles can be stably suspended in an inkjet ink without settling, and after being applied to a substrate surface, drying of the inkjet ink and coalescence of the silver nanoparticles provides opaque printed images of excellent legibility. Further, reliable ink jetting at extended decap times is possible when the inkjet ink is also formulated with specific resins and volatile organic solvents.

Thus, the present invention provides:

(1) An inkjet ink, comprising:

(A) a resin, which is (A1) a terpene resin or (A2) a terpene phenol resin;

(B) a solvent system comprising (B1) a volatile organic solvent having a boiling point of less than 100° C.; and (C) silver nanoparticles.

(2) The inkjet ink of (1), wherein the resin (A) is present in an amount of 0.1 to 5 wt. %, based on a total weight of the inkjet ink.

(3) The inkjet ink of (1) or (2), wherein the resin (A) is the terpene resin (A1).

(4) The inkjet ink of any one of (1) to (3), wherein the terpene resin (A1) is a homopolymer made from α-pinene.

(5) The inkjet ink of (1) or (2), wherein the resin (A) is the terpene phenol resin (A2).

(6) The inkjet ink of any one of (1), (2), or (5), wherein the terpene phenol resin (A2) has a hydroxyl value of 10 to 80 mgKOH/g.

(7) The inkjet ink of any one of (1) to (6), wherein the volatile organic solvent (B1) is present in an amount of 50 to 95 wt. %, based on a total weight of the inkjet ink.

(8) The inkjet ink of any one of (1) to (7), wherein the volatile organic solvent (B1) is an alcoholic solvent.

(9) The inkjet ink of any one of (1) to (8), wherein the volatile organic solvent (B1) is ethanol.

(10) The inkjet ink of any one of (1) to (7), wherein the volatile organic solvent (B1) is a ketone solvent.

(11) The inkjet ink of any one of (1) to (7) or (10), wherein the volatile organic solvent (B1) is methyl ethyl ketone.

(12) The inkjet ink of any one of (1) to (11), wherein the solvent system (B) further comprises (B2) a glycol ether.

(13) The inkjet ink of any one of (1) to (12), wherein the silver nanoparticles (C) are present in an amount of 0.5 to 15 wt. %, based on a total weight of the inkjet ink.

(14) The inkjet ink of any one of (1) to (13), wherein the silver nanoparticles (C) have an average particle size of less than 100 nm.

(15) The inkjet ink of any one of (1) to (14), further comprising (D) an alkanolamine, wherein the alkanolamine (D) is present in an amount of 0.1 to 10 wt. %, based on a total weight of the inkjet ink.

(16) The inkjet ink of (15), wherein the alkanolamine (D) is at least one selected from the group consisting of ethanolamine, propanolamine, isopropanolamine, diethanolamine, and triethanolamine.

(17) The inkjet ink of any one of (1) to (16), further comprising (E) a silicone acrylate copolymer, wherein the silicone acrylate copolymer (E) is present in an amount of up to 5 wt. %, based on a total weight of the inkjet ink.

(18) A printed article, comprising:

a substrate; and an opaque film, formed from the inkjet ink of any one of (1) to (17), disposed on the substrate.

(19) A method of forming an opaque printed image on a substrate, comprising:

applying the inkjet ink of any one of (1) to (17) onto the substrate with a thermal inkjet printhead; and drying the inkjet ink, thereby converting the inkjet ink into an opaque film forming the opaque printed image.

(20) The method of (19), wherein the inkjet ink is dried with a near infrared heater to sinter the silver nanoparticles (C), thereby converting the inkjet ink into the opaque film.

The foregoing paragraphs have been provided by way of general introduction, and are not intended to limit the scope of the following claims. The described embodiments, together with further advantages, will be best understood by reference to the following detailed description.

DETAILED DESCRIPTION OF THE INVENTION

In the following description, it is understood that other embodiments may be utilized and structural and operational changes may be made without departure from the scope of the present embodiments disclosed herein.

Definitions

The phrase "substantially free", unless otherwise specified, describes an amount of a particular component in the inkjet ink being less than 1 wt. %, preferably less than 0.5 wt. %, more preferably less than 0.1 wt. %, even more preferably less than 0.05 wt. %, yet even more preferably 0 wt. %, relative to a total weight of the inkjet ink.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having at least 1, preferably at least 2, preferably at least 3, preferably at least 4 carbon atoms and up to 22, preferably up to 20, preferably up to 18, preferably up to 12, preferably up to 8 carbon atoms. Examples of alkyl groups include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl). Cycloalkyl is a type of cyclized alkyl group. Exemplary cycloalkyl groups include, but are not limited to, cyclopropyl, cyclobutyl, cyclopentyl, cyclohexyl, norbornyl, and adamantyl.

As used herein, the term "fatty" describes a compound with a long-chain (linear) hydrophobic portion made up of hydrogen and anywhere from 8 to 22 carbon atoms, which may be fully saturated or partially unsaturated.

As used herein, the term "aryl" refers to an aromatic group containing only carbon in the aromatic ring(s), such as phenyl, biphenyl, naphthyl, anthracenyl, and the like.

The term "arylalkyl", as used herein, refers to a straight, branched, or cyclic alkyl moiety (as defined above) that is substituted by an aryl group (as defined above) which may itself be optionally substituted by an alkyl group, examples of which include, but are not limited to, benzyl, phenethyl, 3-phenylpropyl, 2-phenylpropyl, 1-phenylpropyl, 4-phenylbutyl, 3-phenylbutyl, 2-phenylbutyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "(meth)acrylate" is used herein to refer to both acrylate and methacrylate groups. In other words, this term should be read as through "meth" is optional. Further, the term "(meth)acrylate" is used generally to refer to both (meth)acrylic acid-based compounds and (meth)acrylic ester-based compounds. Similarly, the term "(meth)acrylamide" is used herein to refer to both acrylamide and methacrylamide groups.

The term "decap behavior" refers to the ability of the inkjet ink to readily eject from the printhead, upon prolonged exposure to air. The inkjet ink "decap time" is measured as the amount of time that an inkjet printhead may be left uncapped before the printer nozzles no longer fire properly, potentially because of clogging or plugging when printing resumes. Generally, nozzle(s) may become clogged (i.e., impeded, slowed) or plugged (i.e., obstructed, substantially or completely closed) by a viscous plug that forms in the nozzle(s) as a result of solvent loss, crusting of the ink, and/or kogation of various ink components in and/or around any of the nozzles. If a nozzle has become clogged, ink droplets ejected through the nozzle's orifice may be misdirected, which may adversely affect print quality. When an orifice is plugged, it becomes substantially or completely blocked. As a result of the nozzle being plugged, the ink droplets may not pass through the affected nozzle. Thus, the criteria for measuring failure to fire by a nozzle is a misdirection of ink through the nozzle's orifice to a lesser or greater degree, or a complete blockage, which can be measured by visually inspecting a printed image.

Throughout the specification, the term "boiling point" (b.p.) refers to the boiling point of a liquid measured at sea-level atmospheric pressure (i.e., 760 mmHg or 1 atmosphere), also called the normal boiling point, unless specified otherwise.

Inkjet Inks

The present disclosure is directed to inkjet inks that possess suitable physical/chemical stability—for example, are not prone to settling—at both ambient temperatures and printhead operating conditions, are jetted reliably, exhibit good adhesion to porous and non-porous substrates, have prolonged decap times while still drying quickly after being applied onto a substrate, and are capable of providing opaque printed images of excellent legibility when printed onto dark colored substrates.

Inkjet inks of the present disclosure generally include the following components: (A) a resin, which is (A1) a terpene resin or (A2) a terpene phenol resin; (B) a solvent system that includes (B1) a volatile organic solvent having a boiling point of less than 100° C.; and (C) silver nanoparticles.

Inkjet inks of the present disclosure may also optionally include one or more of (B2) a glycol ether as part of the solvent system (B), (D) an alkanolamine, (E) a silicone acrylate copolymer, and (F) an additive.

(A) Resin

The inkjet inks of the present disclosure are formulated with a resin (A). Among other benefits, the resin (A) may be used to provide the inkjet inks with desirable decap behavior and running stability (i.e., prevents settling during printing operations), to provide a tackifying effect for suitable adhesion, and/or to provide any film formed therefrom with desirable properties after being dried/cured, such as abrasion performance.

The resin (A) may be employed in the inkjet inks in an amount of at least 0.1 wt. %, preferably at least 0.2 wt. %, preferably at least 0.5 wt. %, preferably at least 0.8 wt. %, more preferably at least 1 wt. %, even more preferably at least 1.5 wt. %, yet even more preferably at least 2 wt. %, and up to 5 wt. %, preferably up to 4.5 wt. %, preferably up to 4 wt. %, more preferably up to 3.5 wt. %, even more preferably up to 3 wt. %, yet even more preferably up to 2.5 wt. %, based on a total weight of the inkjet ink.

The inkjet inks may be formulated with one, or a mixture of resins (A). The one or more resins (A) employed herein are polymeric materials, either homopolymers or copolymers, that contain constitutional units derived from terpene. The resin(s) (A) employed herein may be a terpene resin (A1) and/or terpene phenol resin (A2).

<Terpene Resin (A1)>

The terpene resin (A1) of the present disclosure refers to oligomers or polymers having at least 95 wt. %, preferably at least 96 wt. %, more preferably at least 97 wt. %, more preferably at least 98 wt. %, more preferably at least 99 wt. %, even more preferably at least 99.5 wt. %, yet even more preferably 100 wt. % of constitutional units derived from a polymerizable terpene(s), based on the total constitutional units (100 wt. %) of the terpene resin (A1). Terpenes have a basic skeleton $(C_5H_8)_p$ where p is a positive integer that delineates the number of isoprene units that are successively bound head to tail. For example, hemiterpenes (p=1) have a $C_5H_8$ skeleton, monoterpenes (p=2) have a $C_{10}H_{16}$ skeleton, sesquiterpenes (p=3) have a $C_{15}H_{24}$ skeleton, and so forth.

In some embodiments, the terpene resin (A1) is based on monoterpene monomer units. The monoterpene may be a linear monoterpene (e.g., myrcene, ocimene, etc.), a monocyclic monoterpenes (e.g., limonene, γ-terpinene, α-phellandrene, β-phellandrene, terpinolene, etc.), or a bicyclic monoterpene (e.g., 3-carene, α-pinene, β-pinene, α-fenchene, camphene, etc.), including the various stereoisomers thereof, as well as mixtures thereof. In some embodiments, the monoterpene is a monocyclic monoterpene, with particular preference to limonene. In preferred embodiments, the monoterpene is a bicyclic monoterpene, with particular preference to 3-carene, α-pinene, β-pinene, and camphene, more preferably α-pinene and/or β-pinene, even more preferably α-pinene.

Preferred terpene resins (A1) are those made from polymerization or oligomerization of α-pinene. As known by those of ordinary skill in the art, such terpene resins (A1) may be readily obtained for example through catalytic polymerization/oligomerization (in solution) of α-pinene monomers, which are in turn typically derived from fractional distillation of gum and sulfate turpentines obtained from pines such as *Pistacia terebinthus, Pinus pinaster, Pinus halepensis, Pinus massoniana, Pinus merkusii, Pinus palustris, Pinus taeda*, and *Pinus ponderosa.*

In preferred embodiments, the terpene resin (A1) is a homopolymer made from α-pinene, with an α-pinene content (constitutional units derived from α-pinene) of at least 95 wt. %, preferably at least 96 wt. %, preferably at least 97 wt. %, preferably at least 98 wt. %, preferably at least 99 wt. %, more preferably at least 99.5 wt. % even more preferably at least 99.9 wt. %, yet even more preferably 100 wt %, based on the total constitutional units (100 wt. %) of the terpene resin (A1). While the terpene resins (A1) of the present disclosure may include small amounts of other constitutional units other than constitutional units derived from α-terpene monomers, the amount of other (e.g., non-terpene based) constitutional units is preferably less than 5 wt. %, preferably less than 3 wt. %, preferably less than 1 wt. %, more preferably less than 0.5 wt. %, even more preferably less than 0.1 wt. %, yet even more preferably 0 wt. %, based on the total constitutional units (100 wt. %) of the terpene resins (A1).

In some embodiments, the terpene resin (A1) is a homopolymer made from β-pinene, with a β-pinene content (constitutional units derived from β-pinene) of at least 95 wt. %, preferably at least 96 wt. %, preferably at least 97 wt. %, preferably at least 98 wt. %, preferably at least 99 wt. %, more preferably at least 99.5 wt. %, even more preferably at least 99.9 wt. %, yet even more preferably 100 wt. %, based on the total constitutional units (100 wt. %) of the terpene resin (A1). While the terpene resins (A1) of the present disclosure may include small amounts of other constitutional units other than constitutional units derived from β-terpene monomers, the amount of other (e.g., non-terpene based) constitutional units is preferably less than 5 wt. %, preferably less than 3 wt. %, preferably less than 1 wt. %, more preferably less than 0.5 wt. %, even more preferably less than 0.1 wt. %, yet even more preferably 0 wt. %, based on the total constitutional units (100 wt. %) of the terpene resins (A1).

Both polymeric and oligomeric forms of the terpene resin (A1) may be used herein, including combinations thereof. Typically, terpene resins (A1) are used herein that have a number average molecular weight ($M_n$) of at least 330 g/mol, preferably at least 340 g/mol, preferably at least 400 g/mol, preferably at least 450 g/mol, preferably at least 500 g/mol, preferably at least 550 g/mol, more preferably at least 600 g/mol, more preferably at least 650 g/mol, even more preferably at least 700 g/mol, yet even more preferably at least 750 g/mol, and up to 1,500 g/mol, preferably up to 1,300 g/mol, more preferably up to 1,100 g/mol, more preferably up to 1,000 g/mol, more preferably up to 900 g/mol, even more preferably up to 800 g/mol, yet even more preferably up to 790 g/mol.

The terpene resins (A1) may be in the form of a solid or a liquid at room temperature. When in the form of a solid, the terpene resin (A1) utilized herein may be categorized based upon its softening point (SP), for example according to a ring-and-ball softening point method. The ring-and-ball softening point is defined as the temperature at which a disk of the sample held within a horizontal ring is forced downward a distance of 1 in. (25.4 mm) under the weight of a steel ball as the sample is heated at a prescribed rate in a glycerol bath. For example, the ring-and-ball softening point may be determined according to JIS B7410-which is incorporated herein by reference in its entirety—Measuring apparatus: Automatic Ring-and-Ball Softening Point; Tester: ASP-MGK2, manufactured by MEITECH Company Ltd.; Heating rate: 5° C./min; Temperature at which heating is started: 40° C.; Measurement solvent: glycerol. In some embodiments, the terpene resin (A1) has a softening point of at least 20° C., preferably at least 40° C., preferably at least 60° C., preferably at least 80° C., more preferably at least 100° C., more preferably at least 110° C., more preferably at least 115° C., more preferably at least 120° C., even more preferably at least 125° C., yet even more preferably at least 130° C., and up to 160° C., preferably up to 155° C., preferably up to 150° C., preferably up to 145° C., more preferably up to 140° C., even more preferably up to 138° C., yet even more preferably up to 135° C.

Bromine number is the amount of bromine ($Br_2$) in grams absorbed by 100 grams of a sample, and is an indicator of the degree of unsaturation of the sample. In some embodiments, the terpene resin (A1) employed in the inkjet inks has a bromine number of at least 12, preferably at least 15, preferably at least 19, preferably at least 22, more preferably at least 25, even more preferably at least 26, yet even more preferably at least 27, and up to 35, preferably up to 34, more preferably up to 33, more preferably up to 32, even more preferably up to 31, yet even more preferably up to 30, although terpene resins (A1) having a bromine number above or below (e.g., hydrogenated terpene resins) these values may also find use in the disclosed inkjet inks.

The inkjet inks of the present disclosure may be formulated with a single type of terpene resin (A1), or with a combination of two or more types of terpene resins (A1). Examples of terpene resins (A1) that may be employed in the inkjet inks herein, either alone or in combination, include, but are not limited to, PICCOLYTE A115 (ring-and-ball SP=112-118° C., bromine number=31.5), PICCOLYTE A125 (ring-and-ball SP=122-128° C., bromine number=31.5), PICCOLYTE A135 (ring-and-ball SP=132-138° C. bromine number=27), PICCOLYTE A135 PLUS (ring-and-ball SP=132-138° C.), PICCOLYTE AO PLUS (oligomer, liquid), and PINOVA RESIN 2495 (ring-and-ball SP=132-138° C. bromine number=27), each being made from high purity α-pinene, available from Pinova, as well as PICCOLYTE S25 (made from high purity β-pinene, ring-and-ball SP=22-28° C., bromine number 19), available from Pinova, with specific mention being made to PICCOLYTE A115.

<Terpene Phenol Resin (A2)>

Terpene phenol resins (A2) are the copolymeric reaction products from alkylation of one or more phenolic compounds with one or more terpenes. As known by those of ordinary skill in the art, such resins may be readily obtained through copolymerization of a phenolic compound and a terpene monomer under the catalytic action of strong acids, metal salts having a condensing effect, bleaching earths, Friedel-Craft catalysts or strong Lewis acids, (e.g., boron trifluoride), and the like.

While the terpene phenol resins (A2) of the present disclosure may include small amounts of other constitutional units other than the constitutional units derived from phenolic compounds and constitutional units derived from terpene, the amount of other (e.g., non-phenol and non-terpene based) constitutional units is preferably less than 5 wt. %, preferably less than 4 wt. %, preferably less than 3 wt. %, preferably less than 2 wt. %, more preferably less than 1 wt. %, even more preferably less than 0.5 wt. %, yet even more preferably 0 wt. %, based on the total constitutional units (100 wt. %) of the terpene phenol resin (A2).

The terpene phenol resins (A2) utilized herein may be formed using any terpene having at least one olefinic double bond that is capable of being alkylated by a phenolic compound. In some embodiments, the terpene phenol resin (A2) is formed using monoterpene monomer units. The monoterpene may be a linear monoterpene (e.g., myrcene, ocimene, etc.), a monocyclic monoterpenes (e.g., limonene, γ-terpinene, α-phellandrene, β-phellandrene, terpinolene, etc.), or a bicyclic monoterpene (e.g., 3-carene, α-pinene, β-pinene, α-fenchene, camphene, etc.), including the various stereoisomers thereof, as well as mixtures thereof. In some embodiments, the monoterpene is a monocyclic monoterpene, with particular preference to limonene. In preferred embodiments, the monoterpene is a bicyclic monoterpene, with particular preference to 3-carene, α-pinene, β-pinene, and camphene, more preferably α-pinene and/or D-pinene.

A phenolic compound has at least one hydroxyl group directly bonded to a phenyl ring. All mono- or polyvalent phenolic compounds are useful in the preparation of the terpene phenol resin described herein provided that the phenolic compound has at least two replaceable hydrogen atoms in ortho- and/or para-positions with respect to at least one hydroxyl group. That is, the phenolic compound should be capable of being polyalkylated (e.g., bis-alkylated) with the terpene(s), and thus should have at least two available ortho-/para-positions with respect to at least one hydroxyl group for alkylation.

In preferred embodiments, the phenolic compound is phenol, which is considered the parent unsubstituted phenolic compound (i.e., contains one hydroxyl group bonded directly to the phenyl ring with no other substitution). Alternatively, the phenolic compound may be substituted at up to three positions in addition to the phenolic hydroxyl group, wherein one, two or three of the aromatic hydrogens of phenol are replaced with an equal number of substituents, each independently selected from a hydroxyl group; a $C_1$-$C_{22}$ alkyl group, preferably a $C_2$-$C_{18}$ alkyl group, more preferably a $C_3$-$C_2$ alkyl group, even more preferably a $C_4$-$C_9$ alkyl group, for example, methyl, ethyl, n-propyl, isopropyl, n-butyl, isobutyl, tert-butyl; a $C_1$-$C_{22}$ alkoxy group, preferably a $C_2$-$C_{12}$ alkoxy group, more preferably a $C_3$-$C_6$ alkoxy group, for example, methoxy, ethoxy, and isopropoxy; an aryl group; an arylalkyl group, for example a benzyl group; and a halo group such as chlorine, bromine, fluorine and iodine.

Specific examples of substituted phenolic compounds include, but are not limited to, o-cresol, m-cresol, p-cresol, 2,5-xylenol, 2,3-xylenol, 3,4-xylenol, 3,5-xylenol, 2,3,5-trimethylphenol, isopropylphenol (e.g., 4-isopropylphenol), tert-butylphenol (e.g., 4-tert-butylphenol), amylphenol (e.g., 4-tert-amylphenol), heptylphenol (e.g., 4-heptylphenol), octylphenol (e.g., o-octylphenol, p-octylphenol, etc.), nonylphenol (e.g., 4-(2,4-dimethylheptan-3-yl)phenol), decylphenol, dodecylphenol, bisphenols such as diphenylolpropane (bisphenol-A), phenylphenol (e.g., 3-phenylphenol), cumylphenol, mequinol, benzyloxyphenol, guaiacol, ethoxyphenol (e.g., 4-ethoxyphenol), as well as polyhydric phenolic compounds such as resorcinol, pyrogallol, catechol, and p-hydroquinone, including mixtures of two or more of any of the above. Also included are fused ring phenols such as naphthols (e.g., 1-naphthol, 2-naphthol, etc.) and similar compounds.

In preferred embodiments, the terpene phenol resin (A2) employed in the inkjet ink is a copolymer formed from phenol and one or more of α-pinene, β-pinene, and limonene.

The molecular weight of the terpene phenol resin (A2) may vary depending on the monomers utilized, the reaction conditions, among many other factors, but typically terpene phenol resins (A2) are used that have a weight average molecular weight (Mw) of at least 400 g/mol, preferably at least 500 g/mol, more preferably at least 600 g/mol, even more preferably at least 700 g/mol, and up to 3,000 g/mol, preferably up to 2,500 g/mol, more preferably up to 2,000 g/mol, even more preferably up to 1,500 g/mol, yet even more preferably up to 1,000 g/mol.

The terpene phenol resin (A2) utilized herein may be categorized based upon its softening point (SP), for example according to the ring-and-ball softening point method as described heretofore (e.g., according to JIS B7410-incorporated herein by reference in its entirety). In some embodiments, the terpene phenol resin (A2) has a softening point of at least 60° C., preferably at least 80° C., preferably at least 90° C., preferably at least 100° C. preferably at least 105° C., more preferably at least 110° C., even more preferably at least 115° C., yet even more preferably at least 120° C., and up to 160° C., preferably up to 155° C. preferably up to 150° C., preferably up to 145° C., preferably up to 140° C., more preferably up 20 to 135° C., even more preferably up to 130° C., yet even more preferably up to 125° C.

The hydroxyl value (OHV) is defined as the number of milligrams of potassium hydroxide required to neutralize the acetic acid taken up on acetylation of one gram of a chemical substance that contains free hydroxyl groups. Therefore, the hydroxyl value, or the measure of the relative hydroxyl content of the terpene phenol resin (A2), is directly correlated to the content of the phenolic compound(s) within the terpene phenol resin (A2), with higher hydroxyl values indicating higher phenolic compound incorporation into the copolymer (and lower terpene incorporation). Hydroxyl values can be determined according to Japanese Industrial Standards JIS K 0070: 1992 "Test methods for acid value, saponification value, ester value, iodine value, hydroxyl value, and unsaponifiable matter of chemical products."

The hydroxyl value of the terpene phenol resin (A2) employed in the disclosed inkjet inks may vary, for example, from 10 mgKOH/g to 150 mgKOH/g. However, in terms of decap behavior and running stability, preferred terpene phenol resins (A2) are those having a hydroxyl value of at least 10 mgKOH/g, preferably at least 15 mgKOH/g, preferably at least 20 mgKOH/g, preferably at least 22 mgKOH/g, preferably at least 24 mgKOH/g, preferably at least 25 mgKOH/g, preferably at least 28 mgKOH/g, preferably at least 30 mgKOH/g, preferably at least 32 mgKOH/g, preferably at least 34 mgKOH/g, more preferably at least 36 mgKOH/g, even more preferably at least 38 mgKOH/g, yet even more preferably at least 40 mgKOH/g, and up to 80 mgKOH/g, preferably up to 75 mgKOH/g, preferably up to 70 mgKOH/g, preferably up to 65 mgKOH/g, preferably up to 60 mgKOH/g, more preferably up to 55 mgKOH/g, even more preferably up to 50 mgKOH/g, yet even more preferably up to 45 mgKOH/g, with hydroxyl values (OHV) of 20 to 60 mgKOH/g being the most preferred.

Examples of suitable terpene phenol resins (A2) that may be employed in the inkjet inks herein, either alone or in combination, include, but are not limited to, YS POLYSTER products such as YS POLYSTER U130 (OHV=25 mgKOH/g; SP=130° C.), YS POLYSTER U115 (OHV=30 mgKOH/g; SP=115° C.), YS POLYSTER T160 (OHV=60 mgKOH/g; SP=160° C.), and YS POLYSTER T145 (OHV=65 mgKOH/g; SP=145° C.), available from Yasuhara Chemical Co. Ltd., and DERTOPHENE products such as DERTOPHENE T (OHV=20-50 mgKOH/g; SP=95° C.; Mw=700 g/mol), DERTOPHENE T105 (OHV=40 mgKOH/g; SP=105° C.; Mw=700 g/mol), DERTOPHENE T115 (OHV=50 mgKOH/g; SP=120° C.; Mw=700 g/mol), and DERTOPHENE T160 (OHV=60 mgKOH/g; SP=160° C.; Mw=about 1,000 g/mol), available from DRT/Pinova. Particularly preferred terpene phenol resins (A2) are DERTOPHENE T105 and DERTOPHENE T160.

As will become clear, it has been unexpectedly discovered that specific types of resins (A)—namely a terpene resin (A1) or a terpene phenol resin (A2)—provide the inkjet inks with desirable running stability and decap behavior. Without being bound by theory, it is believed that the terpene resin (A1) or terpene phenol resin (A2) improves the decap behavior of the inkjet inks by forming a thin 'skin' or film covering within the printhead nozzles, thereby creating a temporary seal that prevents or reduces solvent losses during periods of inactivity, but where the 'skin' can be easily broken once the printing operation resumes. The polarity of the terpene resin (A1) and terpene phenol resin (A2) are believed to be high enough for vehicle solubility, but not so high as to inhibit 'skin' formation from taking place due to too strong an interaction with the solvent system. Additionally, it is believed that the terpene resin (A1) and terpene phenol resin (A2) are of proper polarity and compatibility with the solvent system to afford sufficient interparticle electrostatic repulsion between adjacent silver nanoparticles, thereby conferring robust running stability to the inkjet inks.

On the other hand, it has been found that other types of resins, even those commonly employed in pigment dispersion printing inks such as styrene acrylic resins (e.g., JONCRYL 678, a glycol ether free styrene acrylic resin available from BASF), fail to provide acceptable decap properties and stability to the silver nanoparticle-containing inkjet inks herein.

While other types of resins are not necessarily excluded from use in the inkjet inks herein, their optional use is to be accompanied by the terpene resin (A1) and/or the terpene phenol resin (A2). Examples of such other types of resins which may be optionally used in addition to the terpene resin (A1) and/or the terpene phenol resin (A2) in the disclosed inkjet inks include, but are not limited to, phenol resins (i.e. copolymers of phenolic compounds with formaldehyde), for example novolak resins such as PHENOLITE TD-2131 and PHENOLITE TD-2090 available from DIC Corp.;

aliphatic or aromatic hydrocarbon resins such as indene hydrocarbon based resins, pentanediene hydrocarbon based resins, diene resins of cyclopentadiene dimers and indene monomers, and hydrogenated indene/methylstyrene/styrene copolymers, with specific mention being made to ESCOREZ 1304, available from Exxon Mobil, NEVCHEM 100, NEVEX100, NEVTAC 10, NEVTAC 80, NEVTAC 100, NEVTAC 115, LX-685 products, and LX-1000 products, each available from Neville Chemical Co., NORSOLENE S105, available from Cray Valley, PICCO 6100, PICCOTAC 95, REGALITE R1100, REGALITE R1090, REGALITE R7100, REGALITE R1010 and REGALITE R1125, each available from Eastman Chemical, and PICCODIENE 2215, available from Stobec;

phenol-modified hydrocarbon resins, such as those formed from polymerization of one or more of indene, vinyl toluene, and dicyclopentadiene in the presence of a phenolic compound styrenated terpene resins, such as those made from copolymerization of styrene and d-limonene; made from d-limonene available, with specific mention being made to SYLVARES ZT 5100, SYLVARES ZT 105LT, and SYLVARES ZT 106LT, each available from Kraton;

rosin resins, including, but not limited to: rosin ester resins, such as e.g., an ester of a rosin composed mainly of an abietic type or pimaric type resin acid that has been reacted with an alcohol(s) such as glycerin, pentaerythritol, ethylene glycol, diethylene glycol, triethylene glycol, methanol, etc., and optionally hydrogenated or partially hydrogenated, with specific mention being made to HARIESTER products available from Harima Chemicals, Inc., STAYBELITE ESTER 10-E and PERMALYN 6110, each available from Eastman, SUPER ESTER A-125, SUPER ESTER A-75, PENSEL D-125, PINECRYSTAL KE-359 available from Arakawa Chemical Industries, Ltd., and FORAL 85, FORAL 105, HERCOLYN products, PEXALYN products, and PENTALYN products available from Pinova; hydrogenated acidic rosins such as FORAL AX and FORAL DX, each available from Pinova;

partially hydrogenated acidic rosins such as STAYBELITE RESIN-E, available from Eastman, and STAYBELITE and STAYBELITE A, each available from PINOVA;

dimerized rosins such as POLY-PALE partially dimerized rosin available from Eastman; and functionalized rosin resins, for example an ester (e.g., glycerol ester) of a rosin which has been modified with maleic anhydride or a rosin which has been subject to carboxylic acid reduction conditions, with specific mention being made to LEWISOL 28-M and Abitol-E hydroabietyl alcohol, each available from Eastman;

polyamide resins, for example VERSAMID 725, 744, 756, 759 available from BASF Japan Ltd., TOHMIDE 90, 92, 394-N available from Sanho Chemical Co. Ltd., and SUNMIDE 550, 554, 615A, 638, 640 available from Evonik;

epoxy resins including sulfonamide-modified epoxy resins for example AD-PRO MTS available from Rit-Chem;

(meth)acrylate and styrene/(meth)acrylate resins (acrylic resins) for example JONCRYL 63, JONCRYL 67, JONCRYL 586, JONCRYL 611, JONCRYL 678, JONCRYL 682, JONCRYL 693, available from BASF, PARALOID DM-55 and PARALOID B-66, available from Palmer Holland, PARALOID B-72, available from Dow Chemical, USA, and ELVACITE 2013, available from Lucite Inc.;

polyurethane resins, such as those formed from reaction between (i) polyols including, but not limited to, ethylene glycol, propylene glycol, propanediol, butanediol, polyethylene glycol, polypropylene glycol, polytetrahydrofuran diol, 3-methyl-1,5-pentanediol, 1,9-nonanediol, polyester polyols such as polyethylene glycol adipate diol, polyethylene glycol succinate diol, poly(3-methyl-1,5-pentanediol adipate) glycol, poly(3-methyl-1,5-pentanediol terephthalate) glycol, carbonate polyols, and (ii) diisocyanates including, but not limited to, 2,4-toluene diisocyanate, 2,6-toluene diisocyanate, 4,4-diphenylmethane diisocyanate, hexamethylene diisocyanate, and isophorone diisocyanate; for example PERMAX 200, PERMAX 202, and SANCURE 20025F, available from Lubrizol;

polyvinyl butyral resins, for example PIOLOFORM BN 16 and MOWITAL B20H available from Kuraray America. Inc.;

polyhydroxystyrene resins such as poly(p-hydroxy styrene) from DuPont;

vinyl resins, for example UCAR VYHH, VMCH, VMCA, and VAGF, available from Dow Chemical Company, and VINNOL E15/45, H14/36, E15/45M, and E16/40A, available from Wacker Chemie AG, Germany;

sulfonamide modified formaldehyde resins such as p-toluene sulfonamide formaldehyde resin;

cellulose ester resins such as cellulose acetate butyrate (CAB-551-0.01) available from Eastman;

styrene copolymers (including block copolymers) such as styrene/butadiene copolymers, styrene/butadiene/styrene block copolymers, styrene-isoprene-styrene copolymers, styrene-ethylene/butylene-styrene copolymers, and styrene-ethylene/propylene copolymers;

ethylene copolymers (including block copolymers) such as ethylene/vinyl acetate copolymers, ethylene/vinyl acetate/maleic anhydride terpolymers, ethylene butyl acrylate copolymer, and ethylene/acrylic acid copolymer;

as well as polyesters, sulfonated polyesters, polyolefins, cellulose ethers, cellulose nitrate resins, polymaleic anhydrides, acetal polymers, poly(styrene-allyl) alcohols, melamine formaldehyde resins, sulfonamide-modified melamine formaldehyde resins, ketone-aldehyde resins, and polyketone resins;

resins disclosed in U.S. Pat. Nos. 8,207,251 and 9,725,614—each incorporated herein by reference in its entirety;

as well as mixtures thereof.

When present, the inkjet inks may optionally contain these other types of resins, for example, for additional tackifying/binding/adhesive effects, in amounts described above for the resin (A). In some embodiments, the inkjet inks are substantially free of other types of resins (i.e., those other than the terpene resin (A1) and terpene phenol resin (A2)).

(B) Solvent System

In many printing processes that utilize solvent-based inks, and particularly in thermal inkjet printing, the selection of an appropriate solvent system may impact the reliability of the printing process, the properties/appearance of the printed ink product, and the overall printing process efficiency. For example in thermal inkjet printing, the choice of solvent system may 1) aid bubble formation during the jetting process resulting in reliable ink jetting, 2) affect the stability/volatility of the inkjet inks by changing the interaction dynamics between the solvent(s) and the various inkjet ink components and thus the decap behavior, kogation, dispersion stability, and/or drop trajectory, 3) impact the adhesion, rub and scratch resistance, and optical density properties of the printed image through the interactive forces between the solvent system and the other inkjet ink components even though the solvent(s) may no longer be present, or may be present in lesser amounts, after drying, and/or 4) influence the drying time after application or the equipment needed to dry the applied ink.

In light of the above, the solvent system of the disclosed inkjet inks includes one or more volatile organic solvents (B1). Volatile organic solvents are defined herein as those having a boiling point of less than 100° C. Preferred volatile organic solvents are those having a boiling point of less than 99° C., preferably less than 95° C., preferably less than 90° C., preferably less than 88° C., preferably less than 86° C., more preferably less than 84° C. even more preferably less than 82° C., yet even more preferably less than 80° C., for example, from 50° C. to 80° C.

It is preferred that the volatile organic solvent (B1) constitutes a majority of the solvent system (B) used in the inkjet inks herein, i.e., that the volatile organic solvent (B1) constitutes at least 50 wt. % preferably at least 60 wt. %, preferably at least 70 wt. %, more preferably at least 80 wt. % even more preferably at least 85 wt. %, yet even more preferably at least 90 wt. %, and up to 100 wt. %, preferably up to 98 wt. %, more preferably up to 96 wt. %, even more preferably up to 94 wt. %, yet even more preferably up to 92 wt. %, based on a total weight of the solvent system (B). In some embodiments, the volatile organic solvent (B1) is present in the inkjet inks in an amount of at least 50 wt. %, preferably at least 55 wt. %, more preferably at least 58 wt. %, more preferably at least 60 wt. %, even more preferably at least 64 wt. %, yet even more preferably at least 70 wt. %, and up to 95 wt. %, preferably up to 90 wt. % preferably up to 88 wt. %, preferably up to 86 wt. %, more preferably up to 84 wt. %, more preferably up to 82 wt. %, even more preferably up to 80 wt. %, yet even more preferably up to 78 wt. %, based on a total weight of the inkjet ink. When inkjet inks are formulated with an amount of the volatile organic solvent (B1) that is not less than the above mentioned lower-limit, inkjet inks may be realized which are jettable in thermal inkjet printing systems and have acceptable volatility for the purpose of drying times.

An acceptable weight ratio of the volatile organic solvent (B1) to the resin (A) ((B1):(A)) may be at least 10:1, preferably at least 15:1, preferably at least 20:1, preferably at least 25:1, more preferably at least 30:1, even more preferably at least 35:1, yet even more preferably at least 40:1, and up to 100:1, preferably up to 90:1, preferably up to 80:1, more preferably up to 70:1, even more preferably up to 60:1, yet even more preferably up to 50:1.

Examples of volatile organic solvents (B1) (i.e., those having a boiling point of less than 100° C.) include, but are not limited to, alcoholic solvents (e.g., methanol, ethanol, 1-propanol, 2-propanol); ketone solvents (e.g., acetone, methyl ethyl ketone (MEK), and methyl isopropyl ketone); ethers (non-glycol ethers) (e.g., diethyl ether, dipropyl ether, methyl tert-butyl ether, and tetrahydrofuran); esters (e.g., methyl acetate, ethyl acetate), alkanes (e.g., pentane, hexane, heptane); acetonitrile; benzene; dichloromethane; and mixtures thereof.

In preferred embodiments, the volatile organic solvent (B1) is an alcoholic solvent (having a boiling point of less than 100° C.). The inclusion of the alcoholic solvent may be beneficial to aid solvation of the inkjet ink components, particularly when a terpene phenol resin (A2) is employed, and even more so when a terpene phenol resin (A2) is employed that has a relatively high hydroxyl value (e.g., 50 to 80 mgKOH/g), to provide the inkjet inks with acceptable jettability, volatility for the purposes of dry times, and excellent decap times. Suitable examples of alcoholic solvents which may be used singly or in combination in the disclosed inkjet inks include, but are not limited to, methanol, ethanol, 1-propanol, 2-propanol, with specific mention being made to ethanol.

In other preferred embodiments, the volatile organic solvent (B1) is a ketone solvent (having a boiling point of less than 100° C.). The ketone solvent may contain 3, 4, or 5 carbon atoms. Examples of ketone solvents which may be used singly or in combination in the disclosed inkjet inks, include, but are not limited to, acetone, methyl ethyl ketone (MEK), and methyl isopropyl ketone. In particular, jettable inkjet inks with extremely fast drying times and advantageous decap times may be realized when the solvent system (B) includes methyl ethyl ketone.

In some embodiments, the inkjet inks are substantially free of ethers, esters, and alkanes as the volatile organic solvent (B1) component, i.e., no ethers, esters, or alkanes having a boiling point of less than 100° C. are present in the inkjet inks.

The solvent system (B) may also optionally include a glycol ether (B2) to further improve decap performance without substantially worsening ink dry times or causing undesired particle settling. The inclusion of the glycol ether (B2) may be particularly advantageous when the volatile organic solvent (B1) is selected to be an alcoholic solvent or a ketone solvent.

The glycol ether (B2) may be a monoalkyl ether, a dialkyl ether, a monoalkyl monoester ether, or a combination thereof. In preferred embodiments, the glycol ether (B2) is a monoalkyl ether, i.e., contains one free hydroxyl group. The glycol ether (B2) may contain at least 3 carbon atoms, preferably at least 4 carbon atoms, more preferably at least 5 carbon atoms, even more preferably at least 6 carbon atoms, and up to 12 carbon atoms, preferably up to 10 carbon atoms, more preferably up to 8 carbon atoms.

Acceptable examples of glycol ethers (B2) that may be optionally included in the disclosed inkjet inks, include, but are not limited to, ethylene glycol monomethyl ether, ethylene glycol monoethyl ether, ethylene glycol mono-isopropyl ether, ethylene glycol mono-n-propyl ether, ethylene glycol mono-t-butyl ether, ethylene glycol monobutyl ether, ethylene glycol mono-isobutyl ether, diethylene glycol monomethyl ether, propylene glycol monomethyl ether, propylene glycol monoethyl ether, propylene glycol mono-t-butyl ether, propylene glycol mono-n-propyl ether, propylene glycol mono-isopropyl ether, propylene glycol mono-n-butyl ether, dipropylene glycol monomethyl ether, propylene glycol methyl ether acetate, ethylene glycol dimethylether, diethylene glycol dimethylether, diethylene glycol methyl ethyl ether, diethylene glycol diethylether, dipropylene glycol dimethyl ether, dipropylene glycol mono-n-propyl ether, as well as mixtures thereof.

In terms of improving the solubility and decap performance of the inkjet inks without considerably lengthening ink dry times or diminishing running stability, preferred glycol ethers (B2) are those which have a boiling point of from 124° C. to less than 214° C., preferably less than 200° C., preferably less than 190° C., preferably less than 180° C., more preferably less than 175° C., more preferably less than 170° C. more preferably less than 165° C., more preferably less than 160° C., even more preferably less than 155° C., yet even more preferably less than 150° C. In light of the above, preference is given to propylene glycol mono-n-propyl ether.

When employed, the glycol ether (B2) may be present in the inkjet inks in an amount of at least 1 wt. %, preferably at least 2 wt. %, more preferably at least 3 wt. %, even more preferably at least 4 wt. %, yet even more preferably at least 5 wt. %, and up to 20 wt. %, preferably up to 15 wt. %, more preferably up to 10 wt. %, even more preferably up to 8 wt. %, yet even more preferably up to 6 wt. %, based on a total weight of the inkjet ink. In some embodiments, the weight ratio of the volatile organic solvent (B1) to the glycol ether (B2) can be adjusted for desired inkjet properties, including drying times, decap times, and running stability, but is typically within a range of at least 4:1, preferably at least 6:1, more preferably at least 8:1, even more preferably at least 10:1, yet even more preferably at least 12:1, and up to 30:1, preferably up to 25:1, more preferably up to 20:1, even more preferably up to 18:1, yet even more preferably up to 16:1.

In addition to the volatile organic solvent (B1) whose boiling point is less than 100° C. and optionally the glycol ether(s) (B2), the solvent system (B) may also optionally include one or more nonvolatile organic solvents. Nonvolatile organic solvents are defined herein as those having a boiling point of 100° C. or higher. It should be noted that while the glycol ether (B2) may be considered a nonvolatile organic solvent according to the aforementioned boiling point, the glycol ether (B2) of the present disclosure is considered to be different and distinct from the nonvolatile organic solvent, owing to the special behavior of the glycol ether (B2) in the inkjet inks.

Examples of nonvolatile organic solvents include, but are not limited to,

- alcohols such as 1-butanol, 2-butanol, tert-amyl alcohol, 2-methyl-1-butanol, undecanols (e.g., 1-undecanol), dodecanols (e.g., 1-dodecanol), tridecanols (e.g., 1-tridecanol), tetradecanols (e.g., 1-tetradecanol), including terpene alcohols such as monoterpene alcohols (e.g., terpineol, geraniol, citronellol, linalool, etc.);
- glycols such as ethylene glycol and propylene glycol;
- ethers (non-glycol ethers) such as dibutyl ether and dioxane;
- ketone solvents such as 3-pentanone, methyl n-propyl ketone, ethyl isopropyl ketone, methyl isobutyl ketone, cyclohexanone, diacetone alcohol, 3-hexanone, and methyl n-butyl ketone;
- esters such as n-butyl acetate, methyl lactate, ethyl lactate, butyl lactate, methoxyethyl acetate, ethoxyethyl acetate, methoxypropyl acetate, and ethoxypropyl acetate;
- alkanes and alkenes, including isoparrafins and naphthenic oils, such as undecane, dodecane, tridecane, tetradecane, hexadecane, isodecane, isododecane, bicyclohexane, decalin, terpenes (e.g., limonene, terpinene, pinene, etc.), 1-phenyl-1-cyclohexene, 1-tert-butyl-1-cyclohexene, and commercially available mixtures of isoparaffins, for example, ISOPAR E, ISOPAR G, ISOPAR H, ISOPAR L and ISOPAR M (each available from Exxon Mobil), SHELLSOL products available from Shell Chemical Company, SOLTROL products available from Chevron Philips Chemical Co., and IP Solvent available from Idemitsu;
- aromatic solvents such as toluene, xylene, ethylbenzene, chlorobenzene, dichlorobenzene, trichlorobenzene, nitrobenzene, cyanobenzene, methylnaphthalene, and tetralin;
- amides such as dimethylformamide and dimethylacetamide;
- as well as mixtures of two or more thereof.

When present, the nonvolatile organic solvents may be included in amounts of up to 20 wt. %, preferably up to 15 wt. %, preferably up to 10 wt. %, preferably up to 5 wt. %, more preferably up to 4 wt. %, even more preferably up to 2 wt. %, yet even more preferably up to 1 wt. %, based on a total weight of the inkjet inks.

In preferred embodiments, the inkjet inks are substantially free of solvents having a boiling point higher than 190° C., preferably solvents having a boiling point higher than 180° C. preferably solvents having a boiling point higher than 170° C., preferably solvents having a boiling point higher than 165° C., more preferably solvents having a boiling point higher than 160° C., even more preferably solvents having a boiling point higher than 155° C., yet even more preferably solvents having a boiling point higher than 150° C. In some embodiments, the inkjet inks are substantially free of alkane and/or alkene solvents. In some embodiments, the inkjet inks are substantially free of aromatic solvents. In some embodiments, the inkjet inks are substantially free of nonvolatile organic solvents. In some embodiments, propylene glycol is the only nonvolatile organic solvent present in the inkjet inks. In preferred embodiments, the solvent system (B) consists of the volatile organic solvent (B1) (e.g., ethanol and/or MEK), the glycol ether (B2), and optionally a glycol (e.g., propylene glycol).

In preferred embodiments, the inkjet inks of the present disclosure are substantially non-aqueous, meaning that no water is added to the inkjet inks other than what may be incidental amounts of moisture derived from ambient conditions. Preferred inkjet inks have less than 1 wt. %, preferably less than 0.5 wt. %, preferably less than 0.1 wt. %, preferably less than 0.05 wt. %, preferably less than 0.01 wt. % of water, more preferably 0 wt. %, based on the total weight of inkjet inks.

(C) Silver Nanoparticles

Inkjet inks of the present disclosure are formulated with silver nanoparticles (C)—the component primarily responsible for providing opaque printed images of acceptable legibility when the inkjet inks herein are printed onto darker colored substrates. The silver nanoparticles (C) may be employed in any amount that provides opaque printed images of acceptable legibility (opacity) whilst maintaining stability and jettability of the inkjet ink. Typically, the silver nanoparticles (C) are employed in amounts of at least 0.5 wt. %, preferably at least 1 wt. %, preferably at least 1.5 wt. %, preferably at least 2 wt. %, preferably at least 2.5 wt. %, preferably at least 3 wt. %, preferably at least 3.5 wt. %, preferably at least 4 wt. %, preferably at least 4.5 wt. %, more preferably at least 5 wt. %, even more preferably at least 5.5 wt. %, yet even more preferably at least 6 w. %, and up to 15 wt. %, preferably up to 14 wt. %, preferably up to 13 wt. %, preferably up to 12 wt. %, preferably up to 11 wt. %, preferably up to 10 wt. %, more preferably up to 9 wt. %, even more preferably up to 8 wt. %, yet even more preferably up to 7 wt. %, based on a total weight of the inkjet ink.

For use in thermal inkjet printing systems, the silver nanoparticles (C) should resist particle settling. Such non-settling characteristics may be achieved when silver nanoparticles (C) are used with an average particle size of less than 100 nm, preferably less than 95 nm, preferably less than 90 nm, preferably less than 85 nm, preferably less than 80 nm, preferably less than 75 nm, preferably less than 70 nm, preferably less than 65 nm, more preferably less than 60 nm, even more preferably less than 55 nm, yet even more preferably less than 50 nm. For example, preferred silver nanoparticles (C) are those with an average particle size of from 10 nm, preferably from 20 nm, more preferably from 30 nm, even more preferably from 40 nm, up to 90 nm, preferably up to 80 nm, more preferably up to 70 nm, even more preferably up to 60 nm, yet even more preferably up to 50 nm. When silver nanoparticles (C) are employed that fall within the above-mentioned average particle size range, it is possible to produce inkjet inks with advantageous shelf-life and robust running stability. Accordingly, one advantage of the disclosed inkjet inks is their ability to be used in standard thermal inkjet printing systems without the need for specialized mechanical mechanisms (e.g., shaking or stirring mechanisms) to maintain particle suspension.

Inkjet inks containing the silver nanoparticles (C) are not necessarily themselves opaque, owing at least in part to the small particle size of the silver nanoparticles (C)—i.e., the silver nanoparticles (C) are not opacifying, per se. Rather, the silver nanoparticles (C) are of a size small enough to be readily and stably suspended within the inkjet inks, and after application onto a substrate, the silver nanoparticles (C) are able to coalesce to produce an opaque film with high legibility (high opacity) on darker colored substrates. Coalescence of the silver nanoparticles (C) into the opaque film occurs as the inkjet ink dries, and especially efficient coalescence can be achieved through the application of external heat. In terms of the ability to coalesce, silver nanoparticles (C) have been found to be particularly advantageous for the formation of an opaque film, owing at least in part to the low specific heat capacity of metallic silver ($C_p$ of 0.233 J/g° C.), which enables rapid coalescence under mild applied heat, or even without external heat at all. For example, after application onto the substrate, the silver nanoparticles (C) can be rapidly sintered using a near infrared heater or other heat source, resulting in coalescence of the silver nanoparticles (C) and formation of an opaque film, sometimes in as little as 1 to 2 seconds. Such rapid and efficient formation of the opaque film allows the disclosed inkjet inks to be used in high throughput, line-run manufacturing.

As the silver nanoparticles (C) are fully capable of providing opaque printed images of acceptable legibility, there is no need to include traditional opacifying agents in the inkjet inks of the present disclosure. So, while the inclusion of traditional opacifying agents is contemplated herein, in preferred embodiments, the inkjet inks are substantially free of traditional opacifying agents including, but not limited to, titanium dioxide, zirconium silicate, zirconium oxide, tin oxide, cerium oxide, zinc oxide, aluminium oxide, silica, kaolin, calcium carbonate, magnesium carbonate, calcium magnesium carbonate, barium carbonate, sodium feldspar, potassium feldspar, nepheline, calcium silicate, mullite, wollastonite, and talc.

Dispersions

The silver nanoparticles (C) may be provided in the form of a dispersion—a dispersion of the silver nanoparticles (C) in an appropriate organic solvent, and optionally with a dispersant. In some embodiments, the silver nanoparticles (C) are provided in the form of a dispersion having a content of silver nanoparticles (C) (i.e., active content) ranging from at least 5 wt. %, preferably at least 10 wt. %, preferably at least 15 wt. %, preferably at least 20 wt. %, preferably at least 25 wt. %, more preferably at least 30 wt. %, even more preferably at least 35 wt. %, yet even more preferably at least 40 wt. %, and up to 80 wt. %, preferably up to 75 wt. %, preferably up to 70 wt. %, preferably up to 65 wt. %, preferably up to 60 wt. %, more preferably up to 55 wt. %, even more preferably up to 50 wt. %, yet even more preferably up to 45 wt. %, based on a total weight of the dispersion. The amount of the dispersion added to make the inkjet ink may be varied depending on the active content of silver nanoparticles (C) contained in the dispersion, and ultimately on the overall desired loading of silver nanoparticles (C) in the inkjet ink.

Any appropriate organic solvent may be used in the dispersion, such as those volatile organic solvents (B1), glycol ether solvents (B2), and/or nonvolatile organic solvents described previously, so long as the organic solvent is capable of dispersing the silver nanoparticles (C) and is compatible with the other components present in a particular inkjet ink. Preference is given herein to dispersions made using glycol solvents, more preferably propylene glycol.

In some embodiments, the silver nanoparticles (C) are stabilized and/or dispersed in the organic solvent using a dispersant. Any dispersant known to those of ordinary skill in the art for stabilizing/dispersing silver particles—such as those described in U.S. Pat. Nos. 9,725,614, 8,207,251, and 7,270,694, each incorporated herein by reference in its entirety—may be utilized herein, so long as the dispersant is compatible with the other components present in a particular inkjet ink. The dispersant may act as a ligand or capping agent to the silver nanoparticles (C) or may prevent their association or aggregation. The dispersant may be physically or chemically bonded/associated with the silver nanoparticles (C), examples of which include covalent bonding, hydrogen bonding, coordination complex bonding, ionic bonding, association via van der Waals forces or dipole-dipole interactions, or a mixture thereof.

The extent of the coverage of the dispersant on the surface of the silver nanoparticles (C) can vary, for example, from partial to full coverage, depending on the capability of the dispersant to stabilize and/or disperse the silver nanoparticles (C) in a particular organic solvent. Of course, there may be variability as well in the extent of coverage of the dispersant amongst the individual silver nanoparticles (C). The extent of coverage should be sufficient to increase dispersibility/stability of the silver nanoparticles (C) in the organic solvent of the dispersion, and ultimately in the solvent system (B) of the inkjet ink, as compared to the same silver nanoparticles (C) that are not stabilized/dispersed with a dispersant. In light of the above, the amount of dispersant employed may vary, and can be readily determined by those of ordinary skill in the art. Typically, when used, the dispersant is added to the dispersion in an amount of at least 0.1 wt. %, preferably at least 0.5 wt. %, preferably at least 1 wt. %, preferably at least 1.5 wt. %, preferably at least 2 wt. %, more preferably at least 2.5 wt. %, even more preferably at least 3 wt. %, yet even more preferably at least 3.5 wt. %, and up to 10 wt. %, preferably up to 9 wt. %, preferably up to 8 wt. %, preferably up to 7 wt. %, more preferably up to 6 wt. %, even more preferably up to 5 wt. %, yet even more preferably up to 4 wt. %, based on a total weight of the dispersion.

Types of dispersants acceptable for use herein include, but are not limited to, one or more of an organoamine dispersant, a sulfur-containing dispersant, and a polymeric dispersant.

Organoamine dispersants may be monoamines, polyamines, and/or heterocyclic amines containing up to 26 carbon atoms, preferably up to 22 carbon atoms, preferably up to 18 carbon atoms, preferably up to 12 carbon atoms, specific examples of which include, but are not limited to, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, diaminopentane, diaminohexane, diaminoheptane, diaminooctane, diaminononane, diaminodecane. N,N-dimethylamine, N,N-dipropylamine, N,N-dibutylamine, N,N-dipentylamine, N,N-dihexylamine, N,N-diheptylamine, N,N-dioctylamine, N,N-dinonylamine, N,N-didecylamine, N,N-diundecylamine, N,N-didodecylamine, N-methylpropylamine, N-ethylpropylamine, N-propylbutylamine, N-ethylbutylamine, N-ethylpentylamine, N-propylpentylamine, N-butylpentylamine, tributylamine, tripentylamine, trihexylamine, triheptylamine, trioctylamine, 1,2-ethylenediamine, N,N,N',N'-tetramethylethylenediamine, propane-1,3-diamine, N,N,N',N'-tetramethylpropane-1,3-diamine, butane-1,4-diamine, N,N,N',N'-tetramethylbutane-1,4-diamine, pyridine derivatives (e.g., dodecyl pyridine), and mixtures of two or more thereof.

Sulfur-containing dispersants may contain a thiol group, a xanthate group, a thiocarbamate group, a thiourea group, or a derivative thereof. Specific examples of which include, but are not limited to, butanethiol, pentanethiol, hexanethiol, heptanethiol, octanethiol, decanethiol, dodecanethiol, 2-ethanedithiol, 1,2-ethanedithiol, 1,3-propanedithiol, 1,4-butanedithiol, xanthic acid, xanthate salts, and xanthate esters.

Polymeric dispersants may be homopolymeric or copolymeric dispersants, such as those formed from polymerization of one or more of:

- (meth)acrylate monomers, including (meth)acrylate monomers having a polar or reactive group and hydrophobic (meth)acrylate monomers, such as i) (poly) alkylene glycol (meth)acrylates e.g., polyethylene glycol (meth)acrylate, polypropylene glycol (meth) acrylate, polyethylene glycol/polypropylene glycol (meth)acrylate, diethylene glycol mono methyl ether (meth)acrylate, polyethylene glycol mono methyl ether (meth)acrylate, triethylene glycol ethyl ether (meth) acrylate, and 2-(2-ethoxyethoxy) ethyl acrylate; ii) hydroxyl-containing (meth)acrylates e.g., hydroxyethyl (meth)acrylate, hydroxypropyl (meth)acrylate, and
- 2-hydroxy-3-phenyloxypropyl(meth)acrylate; iii) carboxylic acid (meth)acrylates e.g., (meth)acrylic acid; iv) glycidyl (meth)acrylates; v) amine-containing (meth) acrylates e.g., diethylaminoethyl (meth)acrylate and dimethylaminoethyl (meth)acrylate, vi) linear or branched alkyl (meth)acrylates e.g., butyl (meth)acrylate, sec-butyl (meth)acrylate, cetyl (meth)acrylate, decyl (meth)acrylate, dodecyl (meth)acrylate, ethyl (meth)acrylate, 2-ethylhexyl (meth)acrylate, hexyl (meth)acrylate, isoamyl (meth)acrylate, isobutyl (meth)acrylate, lauryl (meth)acrylate, methyl (meth) acrylate, octyl (meth)acrylate, propyl (meth)acrylate, stearyl (meth)acrylate, tridecyl (meth)acrylate, isostearyl (meth)acrylate, and behenyl (meth)acrylate; vii) cycloalkyl (meth)acrylates e.g., cyclohexyl (meth)acrylate, isobornyl (meth)acrylate, dicyclopentadienyl (meth)acrylate, and t-butylcyclohexyl (meth)acrylate; and viii) aryl-containing (meth)acrylates e.g., phenyl (meth)acrylate and 2-phenoxyethyl (meth)acrylate;
- vinyl esters of aliphatic acids, such as vinyl acetate, vinyl propionate, vinyl caprylate, vinyl laurate, vinyl stearate;
- allyl esters of aliphatic acids, such as allyl heptanoate, allyl acetate, allyl caprylate, and allyl caproate;
- styrene and alkyl styrenes, such as styrene, alpha methyl styrene, and p-methylstyrene;
- vinyl halides vinylidene halides, such as vinyl fluoride, vinyl chloride, and vinyl bromide, vinylidene fluoride and vinylidene chloride;
- vinyl alkyl ketones, such as vinyl methyl ketone and vinyl ethyl ketone;
- vinyl ethers, such as isobutyl vinyl ether, dodecyl vinyl ether, hydroxybutyl vinyl ether, cyclohexyl vinyl ether, 4-hydroxymethyl cyclohexylmethyl vinyl ether, and octadecyl vinylether;
- vinylamides, such as N-vinyl-2-pyrrolidone and N-vinyl-2-caprolactam;
- (meth)acrylamides, such as N-methylolacrylamide, N-methylolmethacrylamide, N-cyclohexyl(meth)acrylamide, and N,N-cyclohexylmethyl(meth)acrylamide;
- conjugated dienes such as 1,3-butadiene, 2-chloro-1,3-butadiene, 2,3-dichloro-1,3-butadiene, and isoprene;
- butenedioic acids and their derivatives such as maleic acid, maleic anhydride, and fumaric acid; and
- mixtures thereof.

Specific examples of suitable polymeric dispersants include, but are not limited to, polyacrylic acid (PAA), polymethacrylic acid, polyvinylpyrrolidone (PVP), acrylic acid/maleic acid copolymers, styrene/maleic anhydride copolymers, styrene/(poly)alkylene glycol (meth)acrylate/acrylic acid copolymers, and vinyl acetate/vinyl chloride copolymers including terpolymers. Preference is given herein to a polymeric dispersant, preferably a styrene/(poly) alkylene glycol (meth)acrylate/acrylic acid copolymer, with specific mention being made to a styrene/polyethylene glycol mono methyl ether acrylate/acrylic acid copolymer.

Other examples of polymeric dispersants may include, but are not limited to, polyaspartic acid, polyalkylene glycols (e.g., polyethylene glycols, polypropylene glycols, poly (ethylene/propylene glycol) copolymers), urea aldehyde resins, polyketone resins, polyester resins, polyurethanes, phenol resins, and cellulose-based resins (e.g., cellulose nitrate, cellulose acetate butyrate).

Any method known to those of ordinary skill in the art may be used to provide the dispersion of silver nanoparticles (C). In one non-limiting example, a polyol process is employed whereby a suitable amount of silver (I) oxide is mixed with an organic solvent, preferably a glycol solvent, more preferably propylene glycol, and a dispersant (e.g., styrene/polyethylene glycol mono methyl ether acrylate/acrylic acid copolymer) to form a reaction mixture. The reaction mixture may then be heated at e.g., 30 to 50° C. for an appropriate amount of time (e.g., 30 minutes to 5 hours) to reduce the silver (I) oxide and form a dispersion of silver nanoparticles (C).

(D) Alkanolamine

The inkjet inks may optionally include a neutralization reagent, preferably in the form of an alkanolamine, which are alkane-based compounds that contain both hydroxyl (—OH) and amino (primary, secondary, or tertiary) groups.

In some embodiments, the alkanolamine (D) has a total of at least 2 carbon atoms, preferably at least 3 carbon atoms, preferably at least 4 carbon atoms, and up to 8 carbon atoms, preferably up to 7 carbon atoms, more preferably up to 6 carbon atoms, more preferably up to 5 carbon atoms.

In preferred embodiments, the alkanolamine (D) used in the inkjet inks herein has the following general formula (I):

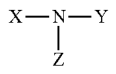

(I)

wherein X, Y and Z are independently selected from the group consisting of hydrogen;

a $C_1$-$C_5$ alkyl group, preferably a $C_2$-$C_3$ alkyl group; and an alkanol group, preferably a $C_2$-$C_5$ alkanol group, more preferably a $C_3$-$C_4$ alkanol group;

wherein at least one of X, Y and Z is an alkanol group (an alkyl substituent that bears at least one hydroxyl group).

In some embodiments, one of X, Y, and Z is an alkanol group. In some embodiments, two of X, Y, and Z are an alkanol group. In some embodiments, X, Y, and Z are all alkanol groups.

With respect to the one or more alkanol groups, the alkyl chain thereof may contain branching. Alternatively, the alkyl chain of the alkanol group may be linear (contains no alkyl branching). In preferred embodiments, the alkanol group(s) is based on a linear alkyl chain. Further, the hydroxyl bearing carbon of the alkanol group may be a primary, secondary, or tertiary carbon, preferably the hydroxyl bearing carbon is a primary or secondary carbon.

The alkanolamine (D) may contain a primary amino group (i.e., two of X, Y, and Z are hydrogen), a secondary amino group (i.e., one of X, Y, and Z are hydrogen), or a tertiary amino group (i.e., X, Y, and Z are all non-hydrogen). When an alkanolamine (D) is employed that contains a secondary amino group, the two non-hydrogen substituents may be the same or different alkanol groups, preferably the same alkanol group, for example as is the case in diethanolamine. When an alkanolamine (D) is employed that contains a tertiary amino group, the three non-hydrogen substituents may be the same or different alkanol groups, preferably the same alkanol group, for example as is the case in triethanolamine.

Suitable examples of the alkanolamine (D) include, but are not limited to, ethanolamine, N-methylethanolamine, N,N-dimethylethanolamine, N-ethylethanolamine, N-propylethanolamine, N-isopropylethanolamine, N,N-diisopropylethanolamine, N-butylethanolamine, diethanolamine, N-methyldiethanolamine, N-ethyldiethanolamine, triethanolamine, propanolamine (3-Amino-1-propanol), N-methylpropanolamine, N,N-dimethylpropanolamine, dipropanolamine, tripropanolamine, isopropanolamine, N,N-dimethylisopropanolamine, diisopropanolamine, triisopropanolamine, 2-amino-2-methyl-1-propanol, 2-amino-2-ethyl-1,3-propanediol, 4-amino-1-butanol, 2-amino-1-butanol, sec-butanolamine, and di-sec-butanolamine. In preferred embodiments, the alkanolamine (D) is at least one selected from the group consisting of ethanolamine, diethanolamine, triethanolamine, propanolamine (3-amino-1-propanol), and isopropanolamine, with isopropanolamine being more preferred.

In some embodiments, the alkanolamine (D) is present in the inkjet inks in amounts of at least 0.1 wt. %, preferably at least 0.2 wt. %, preferably at least 0.3 wt. %, preferably at least 0.4 wt. %, preferably at least 0.5 wt. %, preferably at least 0.6 wt. %, preferably at least 0.7 wt. %, more preferably at least 0.8 wt. %, even more preferably at least 0.9 wt. %, yet even more preferably at least 1 wt. %, and up to 10 wt. %, preferably up to 8 wt. %, preferably up to 6 wt. %, preferably up to 5 wt. %, preferably up to 4 wt. %, more preferably up to 3 wt. %, even more preferably up to 2 wt. %, yet even more preferably up to 1.5 wt. %, relative to the total weight of the inkjet inks. In some embodiments, the weight ratio of the resin (A) to the alkanolamine (D) ((A):(D)) is at least 0.5:1, preferably at least 0.7:1, more preferably at least 1:1, even more preferably at least 1.5:1, yet even more preferably at least 2:1, and up to 15:1, preferably up to 10:1, preferably up to 8:1, preferably up to 6:1, more preferably up to 5:1, even more preferably up to 4:1, yet even more preferably up to 3:1.

(E) Silicone Acrylate Copolymer

The inkjet ink may optionally include (E) a silicone acrylate copolymer as a surfactant. The incorporation of such a surfactant may provide the inkjet inks advantageous nozzle discharge properties, as well as leveling and substrate wetting properties, thus contributing to improved overall print quality. By use of a copolymer made of distinct materials, such as (meth)acrylate and silicone portions, a single ingredient can supply multiple beneficial characteristics to the inkjet inks. For example, the (meth)acrylate portion may provide advantageous leveling and substrate wetting, while the silicone portion may provide desirable anti-crater properties.

The silicone acrylate copolymer (E) may be obtained according to methods known to those of ordinary skill in the art, for example, by polymerization (e.g., free-radical polymerization) or grafting of a polyorganosiloxane macromer comprising at least one polymerizable group (e.g., on one of the ends of the polyorganosiloxane chain, on both ends of the polyorganosiloxane chain, or on the silicone backbone) and a (meth)acrylate monomer, as described for example, in U.S. Pat. No. 5,219,560-incorporated herein by reference in its entirety. Preferably, the silicone acrylate copolymer (E) is a polysiloxane (polyorganosiloxane) modified poly(meth)acrylate, that is, a copolymer composed of a poly(meth)acrylate backbone and one or more polyorganosiloxane side chains grafted to the poly(meth)acrylate backbone (i.e., a graft copolymer). In preferred embodiments, a major proportion of the silicone acrylate copolymer (E) is poly(meth)acrylate. In preferred embodiments, the silicone acrylate copolymer (E) has a polyorganosiloxane content of at least 1 wt. %, preferably at least 2 wt. %, more preferably at least 3 wt. %, even more preferably at least 4 wt. %, and up to 20 wt. %, preferably up to 15 wt. %, more preferably up to 10 wt. %, even more preferably up to 8 wt. %, based on a total weight of the silicone acrylate copolymer (E).

The polyorganosiloxane macromer may be based on any organosilicon polymer or oligomer of linear structure, of variable molecular weight, which can be formed from polymerization and/or polycondensation of suitably functionalized silanes, and which has a polysiloxane backbone structure (silicon atoms are linked together via oxygen atoms, —Si—O—Si—), with alkyl, aryl, and/or arylalkyl groups directly bonded to the (tetravalent) silicon atoms. For example, the polyorganosiloxane backbone may be a polydimethylsiloxane backbone (where each silicon atom in the backbone is directly bonded to two methyl groups), a poly(dimethylsiloxane-co-methylphenylsiloxane) backbone, a poly(dimethylsiloxane-co-diphenylsiloxane) backbone, or a poly(dimethylsiloxane-co-methylalkylsiloxane) backbone.

The polyorganosiloxane macromer may be modified to include at least one polymerizable group (e.g., (meth)acrylate-containing group), preferably the polyorganosiloxane macromer may be end group modified to include a polymerizable group on at least one of the ends of the polysiloxane chain. In some embodiments, the polyorganosiloxane macromer has a polymerizable group on both ends of the polysiloxane chain. In some embodiments, the polyorganosiloxane macromer has a polymerizable group on one end of the polysiloxane chain and a non-polymerizable end group (e.g., trimethyl silane, triphenyl silane, phenyldimethylsilane, etc.) on the other end of the chain. In some embodiments, the polymerizable group may be a styrenyl-type group ($CH{=}C(R_1)$-arylene-) or a (meth)acrylate group, in particular a group represented by $CH_2{=}CR_1{-}CO{-}O{-}R_2{-}$, wherein $R_1$ is a hydrogen or a methyl group and $R_2$ is a divalent, linear or branched hydrocarbon group having 1 to 10 carbon atoms, preferably 2 to 8 carbon atoms, preferably 3 to 6 carbon atoms, and optionally containing ether bonds therein (e.g., one, two, three, four, etc. ether bonds), and optionally containing hydroxyl group substituent(s) (e.g., as in the case of ring-opened products resulting from reaction between an epoxide and (meth)acrylic acid). In preferred embodiments, $R_2$ is $-(CH_2)_n-$ with n=1 to 10, $-CH_2CH(CH_3)CH_2-$, $-CH_2CH_2OCH_2CH_2-$, $-CH_2CHOCH_2CH_2CH(CH_3)CH_2-$, $-CH_2CH_2OCH_2CH_2OCH_2CH_2CH_2-$, and $-CH_2CH(OH)CH_2OCH_2CH_2CH_2-$.

The silicone acrylate copolymer (E) may be made by polymerizing the polyorganosiloxane macromer in the presence of a wide variety of (meth)acrylate monomers, such as those (meth)acrylate monomers mentioned previously, including both (meth)acrylic acid (acrylic acid and meth-acrylic acid) and ester variants, which may be aryl or alkyl (meth)acrylate esters. The poly(meth)acrylate backbone may be formed from one type of monomer, or alternatively from two or more types of (meth)acrylate monomers. In preferred embodiments, the (meth)acrylate monomers are (meth)acrylate alkyl esters, which may be chosen from linear, branched or cyclic alkyl esters, for example $C_1$ to $C_{22}$ alkyl esters, preferably $C_2$ to $C_{20}$ alkyl esters, preferably $C_3$ to $C_{18}$ alkyl esters of acrylates and methacrylates. In some embodiments, the alkyl group is chosen from methyl, ethyl, butyl, stearyl, isostearyl, and 2-ethylhexyl, as well as mixtures thereof. Suitable (meth)acrylate monomers include, but are not limited to, methyl acrylate, ethyl acrylate, isopropyl acrylate, n-butyl acrylate, tert-butyl acrylate, cyclohexyl acrylate, 2-ethylhexyl acrylate, tridecyl acrylate, stearyl acrylate, isostearyl acrylate, behenyl acrylate, methyl methacrylate, ethyl methacrylate, isopropyl methacrylate, n-butyl methacrylate, tert-butyl methacrylate, cyclohexyl methacrylate, 2-ethylhexyl methacrylate, tridecyl methacrylate, stearyl methacrylate, isostearyl methacrylate, behenyl methacrylate, and combinations thereof.

In some embodiments, the silicone acrylate copolymer (E) has a weight average molecular weight of from 3,000 g/mol, preferably from 4,000 g/mol, more preferably from 5,000 g/mol, even more preferably from 8,000 g/mol, yet even more preferably from 10,000 g/mol, and up to 500,000 g/mol, preferably up to 400,000 g/mol, more preferably up to 300,000 g/mol, even more preferably up to 200,000 g/mol, yet even more preferably up to 100,000 g/mol.

When employed in the inkjet inks, the silicone acrylate copolymer (E) may be used as is or, alternatively, may be dispersed or dissolved in an organic solvent such as lower alcohols containing from 2 to 8 carbon atoms (e.g., ethanol, 1-proponol, 2-propanol, 1-butanol, etc.), ester solvents (e.g., methoxyethyl acetate, ethoxyethyl acetate, methoxypropyl acetate, ethoxypropyl acetate, butyl acetate, etc.) or oils (e.g., cyclopentasiloxane). In some embodiments, when employed as a dispersion or solution, the solvent is an ester solvent, most preferably methoxypropyl acetate. In some embodiments, the solids (silicone acrylate copolymer (E)) content of the dispersion or solution is at least 30 wt. %, preferably at least 40 wt. %, preferably at least 50 wt. %, and up to 60 wt. %, preferably up to 55 wt. %, preferably up to 52 wt. %, relative to a total weight of the dispersion/solution.

Representative examples of silicone acrylate copolymers (E) that are commercially available and which may be used in the inkjet inks described herein include, but are not limited to, KP-541, KP-543, KP-545, KP-550, KP-575 (acrylic polymers grafted with polydimethylsiloxane side chains, available from Shin-Etsu Chemical Co., Ltd.), BYK-3550 (available from BYK Japan K.K.), including mixtures thereof. In preferred embodiments, the silicone acrylate copolymer (E) is BYK-3550.

The silicone acrylate copolymer (E) may be employed in amounts of at least 0.01 wt. %, preferably at least 0.05 wt. %, more preferably at least 0.1 wt. %, even more preferably at least 0.5 wt. %, yet even more preferably at least 1 wt. %, and up to 5 wt. %, preferably up to 4 wt. %, more preferably up to 3 wt. %, even more preferably up to 2.5 wt. %, yet even more preferably up to 2 wt. %, preferably up to 1.5 wt. %, based on a total weight of the inkjet ink.

(F) Additives

In addition to the components already mentioned, the inkjet inks may also be optionally formulated with various additives (F) to improve various ink characteristics and performance. For example, the inkjet inks may optionally contain one or more of a colorant, an anti-kogation agent, additional surfactants (i.e., surfactants other than the silicon acrylate copolymer (E)), a stabilizer, and a security taggant, in art appropriate levels.

It is to be readily appreciated by those of ordinary skill in the art that one or more colorants may be optionally included in the inkjet inks to provide inks capable of forming various opaque colors, and the inkjet inks are not limited to any particular color. Any colorant can be employed in the inkjet inks to provide the desired color, including dyes, pigments, mixtures thereof, and the like, provided that the colorant can be dissolved or stably dispersed within the inkjet inks. Suitable colors include, for example, cyan, magenta, yellow, and key (black) ("CMYK"), white, orange, green, light cyan, light magenta, violet, and the like, including both spot colors and process colors. In general, the colorant(s) may be employed in amounts of at least 0.1 wt. %, preferably at least 0.5 wt. %, preferably at least 1 wt. %, preferably at least 2 wt. %, more preferably at least 3 wt. %, even more preferably at least 5 wt. %, yet even more preferably at least 6 wt. %, and up to 20 wt. %, preferably up to 15 wt. %, more preferably up to 10 wt. %, even more preferably up to 8 wt. %, yet even more preferably up to 7 wt. % relative to the total weight of the inkjet inks. The inkjet inks can be formulated with various dyes, with particular preference given to metal complex dyes and organic dyes, specific and non-limiting examples of which include those dyes in the VALIFAST color series such as VALIFAST BLACK 3870, VALIFAST RED 1355, and VALIFAST YELLOW 3150 (which are azo-metal complex dyes), as well as those organic dyes in the OIL color series such as OIL BLUE 613, each available from Orient Chemical Industries Co., Ltd. The inkjet inks can be formulated with any inorganic pigment and/or organic pigment, provided the pigment does not negatively impact the running stability of the inkjet ink to a substantial degree. In addition to providing color to the inkjet inks, such pigments may be capable of improving the light resistance, the weather resistance, etc., of the printed images.

The inkjet inks may optionally contain one or more additional surfactants, in addition to or in lieu of the silicon acrylate copolymer (E). Such additional surfactants may be employed in amounts of at least 0.01 wt. %, preferably at least 0.05 wt. %, more preferably at least 0.1 wt. %, even more preferably at least 0.5 wt. %, yet even more preferably at least 1 wt. %, and up to 5 wt. %, preferably up to 4 wt. %, more preferably up to 3 wt. %, even more preferably up to 2.5 wt. %, yet even more preferably up to 2 wt. %, preferably up to 1.5 wt. %, based on a total weight of the inkjet ink. Such additional surfactants may include, but are not limited to:

- polysiloxanes including organomodified silicones (e.g., alkyl, aryl, and/or arylalkyl modified silicones) such as SILTECH C-32, available from Siltech Corporation, COATOSIL 1211C and 3573, each available from Momentive, KF-410 (an arylalkyl-modified polydimethylsiloxane), available from Shin-Etsu Chemical Co., and BYK-322 and BYK-323 (arylalkyl-modified poly (dimethylsiloxane-co-methylalkylsiloxane)), each available from BYK Additives & Instruments;
- fluoropolymers such as FC-4430 and FC-4432, available from 3M Corporation;
- polyether modified silicones, including those which are block copolymers having a pendent graft structure formed from a linear or branched polydimethylsiloxane backbone containing one or more polyether side chains and optionally one or more fatty alkyl side chains, such as KF-6013 (PEG-9 dimethicone, uncapped, HLB=10.0), KF-6015 (PEG-3 dimethicone, uncapped, HLB=4.5), KF-6017 (PEG-10 dimethicone, uncapped, HLB=4.5), and KF-6038 (Lauryl PEG-9 polydimethylsiloxyethyl dimethicone, uncapped, HLB=3.0), each available from Shin-Etsu Chemical Co.;

photo-cross-linkable silicone acrylates or silicone polyether acrylates such as TEGO RAD 2100, TEGO RAD 2200, TEGO RAD 2250, TEGO RAD 2300 (silicone polyether acrylate), each available from Evonik Industries, and BYK-UV 3500 and 3530, available from BYK;

polyacrylates including polyacrylate copolymers and cross-polymers such as BYK-381 and BYK-361N (polyacrylate copolymer), each available from BYK, PEMULEN EZ-4U (acrylate/C10-C30 alkyl acrylate crosspolymer) and PEMULEN TR-2 (acrylic acid/C10-C30 alkyl acrylate crosspolymer), each available from Lubrizol;

acetylenic diol and acetylenic glycol-based gemini surfactants such as SURFYNOL SEF and DYNOL surfactants, available from Evonik Industries;

polysiloxane-based gemini surfactants such as TEGO TWIN 4100, available from Evonik Industries;

non-ionic polyethers for example as substrate wetting surfactants such as TEGO WET 510 (hydrophilic polyether substrate wetting surfactant), available from Evonik Industries;

ethoxylated fatty amines, such as AMIET 102, AMIET 105, AMIET 302, AMIET 308, AMIET 320, AMIET 502, AMIET 505, and AMIET 515, each available from Kao;

amides of fatty acids, including alkanolamides of fatty acids and alkoxylated alkanolamides of fatty acids, such as coconut fatty acid monoethanolamide, coconut fatty acid monoethanolamide reacted with 2-20 moles of ethylene oxide, cocamide diethanolamine (DEA), lauramide DEA, linoleamide DEA, myristic amide DEA, palmitic amide DEA, and oleamide DEA, with specific mention being made to AMINON L-02 (lauramide DEA) and AMINON PK-02S (palm kernel amide DEA), each available from Kao;

ethers, such as alkoxylated $C_1$-$C_{22}$ alcohols including alkoxylated fatty alcohols such as BIO-SOFT N-600 (C12-C13 alcohol ethoxylate), MAKON DA-4 (ethoxylated isodecyl alcohol), MERPOL SE (alcohol ethoxylate), and POLYSTEP TD-6 (ethoxylated tridecyl alcohol), each available from Stepan, ethylene oxide/propylene oxide copolymers, alkoxylated alkylphenols, and alkyl polyglycosides (APGs) such as those made from reaction between fatty alcohols and glucose;

fatty esters such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters like sorbitan monolaurate (e.g., EMASOL L-10V, available from Kao) and polysorbates including mono-, bi- or tri-fatty acid esterified polysorbates such as TOXIMUL SEE-340 (sorbitan trioleate ethoxylate (20)), available from Stepan; and glycosides of fatty alcohols such as PLANTASENS NATURAL EMULSIFIER HE20 (cetearyl glucoside, sorbitan olivate), available from Clariant;

sulfates, sulfonates, phosphates, and phosphonates, such as alkyl sulfates, alkyl-ester-sulfates, alkyl ether sulfates, alkyl-alkoxy-ester-sulfate, sulfated alkanolamides, glyceride sulfates, alkyl sulfonates, fatty alkylbenzene sulfonates, lower alkyl-benzene sulfonates, alpha olefin sulfonates, lignosulfonates, alkyl aryl ether phosphates, alkyl ether phosphates, and phosphates of fatty alcohols or polyoxyalkylene ethers of fatty alcohols; and amphoteric surfactants including, but not limited to: fatty alkyl betaines such as lauryl betaine (e.g., AMPHITOL 24B, available from Kao); fatty alkyl amido betaines such as fatty amidopropyl dimethylamino betaine; fatty alkyl sultaines such as fatty dimethyl hydroxysultaine, fatty alkyl amido sultaines such as fatty amido propyl dimethylamino hydroxysultaine; amine oxides, such as N-cocoamidopropyl dimethyl amine oxide, dimethyl fatty alkyl amine oxides such as dimethyl coco amine oxide, lauryldimethyl amine oxide (e.g., AMPHITOL 20N, available from Kao); and imidazole-based amphoteric surfactants (e.g., ELEC AC, available from Kao).

In preferred embodiments, the inkjet inks are substantially free of surfactants other than the silicon acrylate copolymer (E).

Methods of Making

Embodiments of the inkjet inks described herein may be prepared by any suitable technique known to those of ordinary skill in the art, for example by combining a resin (A), a volatile organic solvent (B1) and any other desired optional solvent (e.g., a glycol ether (B2)) constituting the solvent system (B), the silver nanoparticles (C), and any desired optional ingredients such as an alkanolamine (D), a silicone acrylate copolymer (E), and/or an additive (F), in any order and stirring, agitating, and/or homogenizing at a temperature between 20 and 100° C. until a homogeneous suspension is formed.

In one example, the inkjet ink may be made by first combining the resin (A) with the volatile organic solvent (B1) and any optional organic solvents such as a glycol ether (B2), in a vessel and stirring for example for at least 10 minutes, preferably at least 15 minutes, preferably at least 20 minutes, preferably at least 25 minutes, preferably at least 30 minutes, preferably at least 35 minutes, preferably at least 40 minutes, preferably at least 45 minutes. Then, the silver nanoparticles (C), and any optional ingredient such as the alkanolamine (D), the silicone acrylate copolymer (E), any desired additive (F) may be added to the mixture with continued mixing for at least 5 minutes, preferably at least 10 minutes, preferably at least 15 minutes, preferably at least 20 minutes, preferably at least 25 minutes, preferably at least 30 minutes or otherwise until complete dissolution. The resulting inkjet ink may then be placed into a printing cartridge suitable for solvent-based ink, such as HP45SI made by Hewlett Packard or a FUNAI TIJ cartridge made by Funai Co.

Properties

Among other advantages, the inkjet inks disclosed herein possess extended decap times, excellent running stability, and provide legible opaque printed images after being applied onto dark colored substrates.

The inkjet inks disclosed herein possess extended decap times as measured by printing a narrow line image (e.g., barcode) (1 mm*1 cm, narrow lines, Monochrome bitmap), exposing the inkjet ink to air (decapping the ink cartridge) for a particular time (e.g., 1, 10, or 20 minutes), reprinting the same narrow line image, and comparing the reprinted image after decapping to the original image to determine if loss of lines/loss of line clarity occurs in the narrow line image. If no loss of lines/loss of line clarity occurs at the tested time interval, then the inkjet inks are given a "G" (Good) decap rating for that time interval. If 1-2 lines are lost/lost clarity at the tested time interval, but not enough to significantly affect the clarity or readability of the narrow line image, then the inkjet inks are given an "A" (Acceptable) decap rating for that time interval. If more than 2 lines are lost/lost clarity at the tested time interval, then the inkjet ink is given an "NG" (Not Good) decap rating for that time interval. Inkjet inks which maintain a "G" or "A" decap rating, preferably a "G" decap rating when decapped for 1 minute or longer, preferably 2 minutes or longer, preferably 3 minutes or longer, preferably 4 minutes or longer, preferably 5 minutes or longer, preferably 10 minutes or longer, preferably 20 minutes or longer, more preferably 30 minutes or longer, even more preferably 45 minutes or longer, yet even more preferably 60 minutes or longer, are considered desirable in terms of decap performance.

To test the inkjet inks for running stability, a narrow line image (e.g., barcode) (1 mm*1 cm, narrow lines, Monochrome bitmap) may be printed uninterrupted for a consecutive number of pages (e.g., printed on 3,000 pages in a continuous printing operation), and the print quality may be assessed throughout the printing operation by visually inspecting certain pages (e.g., 1,000$^{th}$, 2,000$^{th}$, and 3,000$^{th}$ page) for missing nozzles. If no loss of lines/loss of line clarity occur in the page being inspected, then the inkjet ink is given a "G" (Good) running stability rating for that page. If 1-2 lines are lost/lost clarity in the page being inspected, but not enough to significantly affect the clarity or readability of the narrow line image, then the inkjet ink is given an "A" (Acceptable) running stability rating for that page. If more than 2 lines are lost/lost clarity in the page being inspected, then the inkjet ink is given an "NG" (Not Good) running stability rating for that print. Inkjet inks which maintain a "G" or "A" rating, preferably a "G" rating, when printed for at least 100 pages, preferably at least 500 pages, preferably at least 1,000 pages, preferably at least 1,500 pages, preferably at least 2,000 pages, preferably at least 2,500 pages, preferably at least 3,000 pages, preferably at least 3,500 pages, preferably at least 4,000 pages, preferably at least 4,500 pages, preferably at least 5,000 pages, are considered desirable in terms of running stability (ability to remain dispersed/suspended without settling/sedimentation and improper jetting).

To test the inkjet inks for legibility (opacity) on a dark colored substrate, the inkjet inks may be used to print a solid block image (e.g., 1 cm*10 cm) onto a black substrate such as the black portion of the Form 2C Opacity Chart, available from Leneta Company, Inc. The color difference (denoted by $\Delta E^*_{ab}$) between the silver solid block image and the black portion of the Form 2C Opacity Chart may then be determined by measuring the CIELAB color space (a* and b* and L* values) of each using an appropriate colorimeter (e.g., eXact colorimeter by X-Rite), and calculating the color difference according to the formula:

$$\Delta E^*_{ab} = \sqrt{(\Delta L^*)^2 + (\Delta a^*)^2 + (\Delta b^*)^2}$$

Inkjet inks which provide a $\Delta E^*_{ab}$ value of 10 or higher when printed on the black portion of the Form 2C Opacity Chart are considered herein to be desirable in terms of their legibility (opacity), whereas inkjet inks which provide a $\Delta E^*_{ab}$ value of less than 10 are considered to provide inadequate opacity (illegible).

Printed Article

The inkjet inks can be printed on various substrates including three dimensional parts as well as flat sheets or webs that are supplied in roll form, for the manufacture of a wide variety of printed articles. The substrates may possess various surface types, for example, a flat surface, a structured surface, such as grained surfaces, and a three-dimensional surface, such as curved and/or complex surfaces, which are notoriously difficult substrates owing to the long distance that the ink must travel to reach all parts of the curved and/or complex surface. Additionally, the substrate may be of a dark color that typically presents legibility problems when traditional inks are used, for example, the substrate may be black, amber, dark blue, dark green, red, etc. The printed article may thus contain an opaque film, formed from the disclosed inkjet ink, disposed on a surface of such a dark colored substrate.

Such printed articles may be suitable in the graphic arts, textiles, packaging (e.g., food packaging, pharmaceutical packaging, etc.), lottery, direct mail, business forms and publishing industries, examples of which include a tag or label, a lottery ticket, a publication, packaging (e.g., food packaging, pharmaceutical packaging, blister packaging, other various flexible packaging, etc.), a folding carton, a rigid container (e.g., a plastic cup or tub, glass containers, metal cans, bottles such as PET bottles, jars, and tubes), envelopes, corrugate, a point-of-sale display, and the like. Particularly preferred printed articles are those having an opaque film formed from the disclosed inkjet ink disposed on a dark colored printed article or a dark colored portion of the printed article. For example, the printed article may be a tinted or amber glass bottle (e.g., a soft drink bottle formed of tinted glass), a metal bottle cap, a dark colored jar lid (e.g., a pickle jar lid made of metal), dark colored (e.g., black) tubing or piping, a dark colored computer component, dark consumer product packaging, etc. having an opaque printed image disposed thereupon.

The inkjet inks may be printed on porous (or penetrable) substrates, examples of which include, but are not limited to, non-coated paper (plain paper), wood, membranes, corrugate (corrugated cardboard/fiberboard), and fabrics (including, for example, but not limited to, woven fabric, non-woven fabric, and foil-laminated fabric).

The inkjet inks may also be printed on non-porous (or non-penetrable/non-penetration) substrates, for example, various plastics, glass, metals (e.g., steel, aluminum, etc.), and/or non-penetration papers (e.g., coated papers such as varnish coated papers), including, but not limited to, molded plastic or metal parts as well a flat sheets or rolls of plastic or metallic films. Examples include those substrates containing polyesters such as polyethylene terephthalate (PET), biaxially oriented polystyrene (OPS), polyolefins such as polyethylene (PE), polypropylene (PP), oriented polypropylene (OPP), and biaxially oriented polypropylene (BOPP), polylactic acid (PLA), nylon and oriented nylon, polyvinyl chloride (PVC), cellulose triacetate (TAC), polycarbonate, acrylonitrile butadiene styrene (ABS), polyacetal, polyvinyl alcohol (PVA), coated papers such as varnish coated papers, and metals such as steel and aluminum, and the like.

Method of Forming a Printed Image

With inkjet printing, a desired printed image is formed when a precise pattern of dots is ejected from a drop-generating device, known as a printhead, onto a print medium. The printhead has an array of precisely formed nozzles located on a nozzle plate and attached to an inkjet printhead substrate. The inkjet printhead substrate incorporates an array of firing chambers that receive inkjet ink through fluid communication with one or more ink reservoirs. Each firing chamber has a resistor element, known as a firing resistor, located opposite the nozzle so that the inkjet ink collects between the firing resistor and the nozzle. Each resistor element is typically a pad of a resistive material and measures for example about 35 μm×35 μm. The printhead is held and protected by an outer packaging referred to as a print cartridge or an inkjet pen. Upon energizing of a particular resistor element, a droplet of inkjet ink is expelled through the nozzle toward the print medium. The firing of ink droplets is typically under the control of a microprocessor, the signals of which are conveyed by electrical traces to the resistor elements, forming alphanumeric and other image patterns on the print medium. Since the nozzles are small, typically 10 μm to 40 μm in diameter, inks that minimize clogging are desired. In particular, since thermal inkjet (TIJ) is an open atmosphere print head design (the nozzle orifices are open to atmosphere and there is no valve seal at the orifice to allow ink pressurization), TIJ printing has historically suffered from poor performance during intermittent printing, where decap time (print idle time) causes premature drying of ink in and around the nozzles.

The present disclosure provides a method of forming an opaque printed image by applying the inkjet ink, in one or more of its embodiments, onto a surface of a substrate by a thermal inkjet printhead and drying the inkjet ink, thereby converting the inkjet ink into an opaque film forming the opaque printed image. Use of the inkjet inks described herein overcomes the settling problems and short decap times associated with traditional opaque pigmented inks, while producing high quality legible prints even on dark colored substrates.

Any drop on demand printhead known to those of ordinary skill in the art of inkjet printing can be used as printing units in the present method, including continuous printheads, thermal printheads, electrostatic printheads, and acoustic printheads, preferably a thermal printhead (having a thermal transducer) is used. Typical parameters, such as, for example, printing resolution, printing speed, printhead pulse warming temperature, driving voltage and pulse length, can be adjusted according to the specifications of the printhead. Printheads which are generally suitable for usage in the methods herein have a droplet size in the range of 2 to 80 pL and a droplet frequency in the range of 10 to 100 kHz, and high quality prints may be obtained for example by setting the driving voltage to 8.0 to 9.5 Volts, the print speed up to 300 feet/minute, the pulse warming temperature to 25 to 45° C., and the pulse length to 0.7-2.5 microseconds, although values above or below these described may also be used and still obtain satisfactory prints.

Additionally, as the inkjet inks described herein possess excellent running stability (are not prone to particle settling during printing operations that results in clogged nozzles and defective jetting), there is no need to use printheads equipped with special mechanical mechanisms, such as shaking or stirring mechanisms, to maintain particles in suspension in the methods disclosed herein. Accordingly, the use of specialty printheads designed to maintain particle suspension via agitation is entirely optional, and in preferred methods herein, such specialty printheads are not employed.

Examples of suitable printheads for use in the disclosed methods include, but are not limited to, HP45SI made by Hewlett Packard and FUNAI TIJ cartridge made by Funai Co.

After application, the inkjet ink is dried. Any drying technique that at least partially removes solvent from the applied inkjet ink, and results in the coalescence of the silver nanoparticles (C) to form an opaque film can be used in the present method. The drying technique may also increase the dissolution of the resin (A) and/or disassociate/remove the optional dispersant from the silver nanoparticles (C).

In some embodiments, drying is achieved by allowing the applied inkjet ink to dry under ambient conditions (in air, at about 23° C.). In such embodiments, external heat is not applied to facilitate drying or to increase drying speeds (unassisted drying). For example, the inkjet ink may be allowed to dry for 5 minutes or less, preferably 4 minutes or less, preferably 3 minutes or less, preferably 2 minutes or less, preferably 1 minute or less, preferably 45 seconds or less, preferably 30 seconds or less, more preferably 15 seconds or less, even more preferably 10 seconds or less, yet even more preferably 5 seconds or less, or otherwise until an opaque film of acceptable legibility is formed on the substrate surface.

In preferred embodiments, the inkjet ink is dried through the application of external heat using a heater or other type of heating device. The heater may dry the applied inkjet ink using thermal energy (e.g., hot air), infrared (IR) radiation including near infrared radiation, ultraviolet (UV) radiation, radiation from the visible region of the spectrum, electron beam (EB) radiation, radiation from a laser source, intense pulsed light, and/or microwave radiation. Heating the inkjet ink using one or more of the above-mentioned heating techniques may facilitate coalescence and/or increase the speeds at which the silver nanoparticles (C) coalesce to form the opaque film. Heating may thus provide for rapid and efficient formation of the opaque film for use in high throughput, line-run manufacturing. The application of heat may also enhance the degree that the silver nanoparticles coalesce, which can produce auxiliary benefits such as improved adhesion and abrasion performance of the opaque printed image.

Particularly preferred methods involve drying the applied inkjet ink with a near infrared (NIR) heater. Subjecting the inkjet inks to near infrared heat sinters the silver nanoparticles (C) and provides an opaque film of dense silver layers. Typical parameters, such as, for example, the type of NIR lamps used, peak wavelength, the sintering area, the maximum electrical power density of the system, the sintering time, the distance between the printhead and the NIR heater, and the gap between the NIR heater and the substrate, can be adjusted as needed to achieve sufficient drying of the inkjet ink and sintering/coalescence of the silver nanoparticles (C), according to the specifications of the particular NIR heater used.

NIR heaters which are generally suitable for usage in the methods herein have a peak wavelength of at least 800 nm, preferably at least 850 nm, more preferably at least 900 nm, even more preferably at least 950 nm, yet even more preferably at least 1,000 nm, and up to 1,200 nm, preferably up to 1,150 nm, more preferably up to 1,100 nm, even more preferably up to 1,050 nm. Silver nanoparticles (C) can be rapidly sintered at this NIR wavelength, at least in part due to the low specific heat capacity of metallic silver ($C_p$ of 0.233 J/g° C.). For example, the silver nanoparticles (C) can be efficiently sintered to form an opaque film of excellent legibility when the inkjet ink is heated with the near infrared heater for 10 seconds or less, preferably 9 seconds or less, preferably 8 seconds or less, preferably 7 seconds or less, preferably 6 seconds or less, preferably 5 seconds or less, preferably 4 seconds or less, more preferably 3 seconds or less, even more preferably 2 seconds or less, yet even more preferably 1 second or less. Such speeds make the disclosed methods amenable to high throughput, line-run manufacturing.

In one non-limiting example, the substrate may be conveyed under an inkjet ink printhead which applies the inkjet ink of the present disclosure. The substrate containing the inkjet ink in the desired printing pattern may then be conveyed in-line under a heater (e.g., NIR heater) to sinter the silver nanoparticles (C), thereby converting the inkjet ink into an opaque film forming the opaque printed image. The distance of travel between the printhead and the heater is preferably from at least 30 cm, preferably at least 35 cm, more preferably at least 40 cm, even more preferably at least 45 cm, yet even more preferably at least 50 cm, and up to 100 cm, preferably up to 90 cm, more preferably up to 80 cm, even more preferably up to 70 cm, yet even more preferably up to 60 cm. The gap between the heater and the substrate may range from at least 1 cm, preferably at least 2 cm, more preferably at least 3 cm, and up to 15 cm, preferably up to 10 cm, more preferably up to 5 cm. The speed at which the substrate is conveyed under the heater may range from at least 5 feet/min, preferably at least 15 feet/min, more preferably at least 30 feet/min, even more preferably at least 40 feet/min, yet even more preferably at least 50 feet/min, and up to 300 feet/min, preferably up to 200 feet/min, more preferably up to 100 feet/min, even more preferably up to 75 feet/min. It should be understood that the above parameters are merely exemplary, and such parameters can be adjusted outside of the above ranges as appropriate.

Once the applied ink is deemed dry, further coatings of inkjet ink may be applied, or any processing steps known to those of ordinary skill in the art may be performed as desired.

It should also be recognized that substrate surface treatments such as corona treatment, atmospheric plasma treatment, and flame treatment may optionally be employed in the methods herein prior to application of the inkjet inks to improve printed article characteristics, for example ink adhesion. The parameters of such substrate surface treatments may be varied greatly depending on the substrate material to be printed, the specific inkjet ink utilized, the printing method applied, and the desired properties and applications of the printed article.

The examples below are intended to further illustrate the inkjet inks and are not intended to limit the scope of the claims.

Examples

Materials

Glycol ether PnP is propylene glycol mono-n-propyl ether (b.p. 149° C.). ISOPAR E is a synthetic isoparaffinic fluid (C8-9 isoparaffins) with a distillation range of 115-140° C., available from Exxon Mobil. BYK-3550 is a silicone acrylate copolymer, available from BYK Japan K.K. JONCRYL 678 is a glycol ether free styrene acrylic resin available from BASF. PICCOLYTE A115 (ring-and-ball SP=112-118° C., bromine number=31.5) is a terpene resin made from high purity α-pinene, available from Pinova. DERTOPHENE T105 (OHV=40 mgKOH/g; SP=105° C.; Mw=700 g/mol) and DERTOPHENE T160 (OHV=60 mgKOH/g; SP=160° C.) are terpene phenol resins available from DRT/Pinova.

Silver Nanoparticle Dispersion

The silver nanoparticle dispersion used in the following examples is a dispersion of metallic silver nanoparticles (about 40% by weight) and a styrene/polyethylene glycol monomethyl ether acrylate (n=9)/acrylic acid co-polymer (dispersant, about 3.3% by weight) in propylene glycol. The silver nanoparticles have an average particle size of less than 100 nm. The silver nanoparticle dispersion was prepared as follows:

<Preparation of dispersant> 1,4-dioxane (100.0 g) was added into a 1,000 mL flask equipped with a thermometer and a reflux device, and was heated until 80° C., then treated by nitrogen gas for 10 min. Styrene monomer (60.0 g), polyethylene glycol monomethyl ether acrylate (n=9) (37.0 g), acrylic acid (3.0 g), and 3-mercaptopropionic acid (1.5 g) as chain transfer agent were added into a beaker and mixed for 10 min as mixture-A. Next, 1,4-Dioxane (20.0 g) and 2,2'-azobis(2,4-dimethylvaleronitrile) (0.20 g) were mixed in a beaker as mixture-B. The mixtures-A and B were separately dropped into the flask containing 1,4-dioxane via dripping funnels over 90 min. After the dropwise additions were complete, the temperature of the flask was increased until 90° C. was achieved, and the reaction was mixed for 1 hour. The reaction was then cooled down to room temperature (about 23° C.), and volatile liquids were removed by a rotary evaporator, to obtain the styrene/polyethylene glycol monomethyl ether acrylate (n=9)/acrylic acid co-polymer (dispersant).

<Preparation of silver nanoparticle dispersion> Silver (I) oxide (10.0 g), dispersant from above (0.8 g), and propylene glycol (13.1 g) were added into a 100 mL flask and mixed by magnetic stirrer for 30 min. The temperature of mixture was controlled by water bath to keep at 40° C. for 1 hour. A brownish silver nanoparticle dispersion was obtained, and was used as-is.

Inkjet Ink Evaluation Methods

Inkjet ink examples made with either ethanol or ISOPAR E were evaluated through a HP45SI cartridge made by Hewlett Packard (thermal printing technology related to Hewlett Packard was used to evaluate the inks, software and hardware made by Inc.jet, Transport table made by Kirk Rudy) using the following printing conditions:

Voltage; 8.6 V

Pulse length; 1.80 μs

Pulse warming; OFF.

Inkjet ink examples made with methyl ethyl ketone were evaluated with a FUNAI TIJ cartridge made by Funai Co. (thermal printing technology related to FUNAI was used to evaluate the inks; software and hardware made by XiJet, Transport table made by Kirk Rudy) using the following printing conditions.

Voltage; 9.0 V

Pre-fire; 260 ns,

Dead time: 1200 ns,

Main fire; 500 ns,

Pre-warming; ON at 30° C.

After application of the inkjet inks onto the substrate, the substrate containing the inkjet ink in the requisite printing pattern was conveyed about 50 cm in-line to an NIR heater (model: NIR120M3 made by Adphos), and the inkjet inks were dried under the following conditions:

Power; 50%

Gap between the NIR heater and the substrate; 3 cm

Conveyer speed; 50 feet/minute.

Legibility Evaluation

For evaluating legibility, the printing conditions utilized were as follows:

printing substrate; Form 2C Opacity Chart, a black and white sealed opacity chart with overall dimensions of 7⅝×10¼ in (194×260 mm), available from Leneta Company, Inc.

Printing resolution; 300 dpi*300 dpi (vertical*horizontal)

Printing speed; 50 feet/minute

Printing image; 100% duty (1 cm*10 cm, Monochrome bitmap, solid block image)

Condition; 25° C., 30% humidity

The solid block image was printed on the black portion of the Form 2C Opacity Chart printing substrate according to the conditions above. The color difference (denoted by $\Delta E^*_{ab}$) between the silver solid block image and the black portion of the Form 2C Opacity Chart was determined by measuring the CIELAB color space (a* and b* and L* values) of each using an eXact colorimeter by X-Rite, and calculating the color difference according to the formula:

$$\Delta E^*_{ab} = \sqrt{(\Delta L^*)^2 + (\Delta a^*)^2 + (\Delta b^*)^2}$$

A higher $\Delta E^*_{ab}$ value indicates greater color difference, and thus greater legibility (in this case greater degree of opacity provided by the inkjet ink).

Inkjet inks which provided a $\Delta E^*_{ab}$ value of 10 or higher were deemed to be sufficiently opaque (legible on the black substrate), whereas inkjet inks which provided a $\Delta E^*_{ab}$ value of less than 10 were deemed to have insufficient opacity (illegible on the black substrate).

Decap Time Evaluation

For evaluating decap times, the printing conditions utilized were as follows:

Printing substrate; non-coated paper (plain paper)

Printing resolution; 300 dpi*300 dpi (vertical*horizontal)

Printing speed; 50 feet/minute

Printing image; 100% duty (1 mm*1 cm, Monochrome bitmap, narrow line image)

Condition; 25° C., 30% humidity

The narrow line image was printed to confirm that there were no missing or unclear lines included in the printed image (signifying plugged or missing nozzles). After confirming, the printhead was left decapped for a specific time (1, 10, or 20 minutes), then reprinted using the same narrow line image. The reprinted image (after the specific time lapse) was checked to determine whether loss of lines/loss of line clarity occurred. If no loss of lines/loss of line clarity occurred at the tested time interval, then the inkjet ink was given a "G" (Good) decap rating for that time interval. If 1-2 lines were lost/lost clarity at the tested time interval, but not enough to significantly affect the clarity or readability of the narrow line image, then the inkjet ink was given an "A" (Acceptable) decap rating for that time interval. If more than 2 lines were lost/lost clarity at the tested time interval, then the inkjet ink was given an "NG" (Not Good) decap rating for that time interval. Suitable/desirable inkjet inks are those which maintain a "G" or an "A" decap classification when decapped (i.e., exposed to air) for each of the tested time intervals.

Running Stability Evaluation

For evaluating the running stability of the inks during printing operations (the ability to remain dispersed/suspended without settling/sedimentation), the printing conditions utilized were as follows:

Printing substrate; non-coated paper (plain paper)

Printing resolution; 300 dpi*300 dpi (vertical*horizontal)

Printing speed; 50 feet/minute

Printing image; 100% duty (1 mm*1 cm. Monochrome bitmap, narrow line image)

Condition; 25° C., 30% humidity

The narrow line image was printed uninterrupted on 3,000 consecutive pages, and the print quality of the 1,000$^{th}$, 2,000$^{th}$, and 3,000$^{th}$ pages were determined through visual inspection methods by checking for any missing nozzles. If no loss of lines/loss of line clarity occurred in the page being inspected, then the inkjet ink was given a "G" (Good) running stability rating for that page. If 1-2 lines were lost/lost clarity in the page being inspected, but not enough to significantly affect the clarity or readability of the narrow line image, then the inkjet ink was given an "A" (Acceptable) running stability rating for that page. If more than 2 lines were lost/lost clarity in the page being inspected, then the inkjet ink was given an "NG" (Not Good) running stability rating for that page. Suitable/desirable inkjet inks are those which maintain a "G" or an "A" running stability rating for each page analyzed.

Inkjet Ink Examples

Example inkjet inks are given in Table 1. The amount of each component is expressed in terms of weight percentage relative to a total weight (100%) of the inkjet ink. * denotes the example is a comparative example.

Preparation Methods

To prepare the example inkjet inks, the resin(s) were combined with the glycol ether along with ethanol, methyl ethyl ketone (MEK), or ISOPAR E. and mixed by mechanical stirrer for at least 30 minutes. The silver nanoparticle dispersion, isopropanolamine, and the silicone acrylate copolymer were then added into the mixture and mixed for at least 30 minutes to obtain the inkjet inks. The inkjet ink examples were then evaluated through either a FUNAI TIJ cartridge made by Funai Co., or a HP45SI cartridge made by Hewlett Packard.

TABLE 1

| Inkjet Ink Examples 1-10 | | | | | | | | | | | |
|---|---|---|---|---|---|---|---|---|---|---|---|
| Ingredient | | Ex 1 | Ex 2 | Ex 3 | Ex 4 | Ex 5 | Ex 6 | Ex 7 | Ex 8* | Ex 9* | Ex 10* |
| Ethanol | (B1) | 76.0 | 86.0 | 81.0 | 61.0 | 74.0 | — | — | 76.0 | 72.0 | — |
| Methyl ethyl ketone | (B1) | — | — | — | — | — | 76.0 | 76.0 | — | — | — |
| Glycol ether PnP | (B2) | 5.0 | 5.0 | 5.0 | 5.0 | 5.0 | 5.0 | 5.0 | 5.0 | 5.0 | 5.0 |
| ISOPAR E | — | — | — | — | — | — | — | — | — | — | 76.0 |
| Isopropanolamine | (D) | 1.0 | 1.0 | 1.0 | 1.0 | 1.0 | 1.0 | 1.0 | 1.0 | 1.0 | 1.0 |
| BYK-3550 | (E) | 1.0 | 1.0 | 1.0 | 1.0 | 1.0 | 1.0 | 1.0 | 1.0 | 1.0 | 1.0 |
| JONCRYL 678 | — | — | — | — | — | — | — | — | 2.0 | — | — |
| PICCOLYTE A115 | (A1) | — | — | — | — | — | — | 2.0 | — | — | 2.0 |

TABLE 1-continued

| Inkjet Ink Examples 1-10 | | | | | | | | | | | |
|---|---|---|---|---|---|---|---|---|---|---|---|
| Ingredient | | Ex 1 | Ex 2 | Ex 3 | Ex 4 | Ex 5 | Ex 6 | Ex 7 | Ex 8* | Ex 9* | Ex 10* |
| DERTOPHENE T105 | (A2) | — | — | — | — | — | 2.0 | — | — | — | — |
| DERTOPHENE T160 | (A2) | 2.0 | 2.0 | 2.0 | 2.0 | 4.0 | — | — | — | 6.0 | — |
| Silver nanoparticle dispersion (wt. % active) | (C) | 15.0 (6.0) | 5.0 (2.0) | 10.0 (4.0) | 30.0 (12.0) | 15.0 (6.0) | 15.0 (6.0) | 15.0 (6.0) | 15.0 (6.0) | 15.0 (6.0) | 15.0 (6.0) |
| Total | | 100.0 | 100.0 | 100.0 | 100.0 | 100.0 | 100.0 | 100.0 | 100.0 | 100.0 | 100.0 |

Inkjet Ink Performance

As shown in Table 2, inkjet inks formulated with silver nanoparticles, a volatile organic solvent having a boiling point of less than 100° C. such as MEK or ethanol, and either a terpene resin or a terpene phenol resin were found to possess excellent decap behavior, running stability, and provided legible opaque printed images on the tested black substrate (Examples 1-7).

Conversely, inkjet inks which were formulated with a styrene acrylic resin (JONCRYL 678) instead of a terpene resin or terpene phenol resin, while capable of providing legible printed images, were found to suffer from unacceptable decap times at all decap times tested, and were also found to be unstable during running stability testing, with particle settling and defective jetting occurring by the $1{,}000^{th}$ print (Example 8).

TABLE 2

| Performance of Inkjet Ink Examples 1-10 | | | | | | | | | | | |
|---|---|---|---|---|---|---|---|---|---|---|---|
| | | Ex 1 | Ex 2 | Ex 3 | Ex 4 | Ex 5 | Ex 6 | Ex 7 | Ex 8* | Ex 9* | Ex 10* |
| Running | 1,000 | G | G | G | G | G | G | G | NG | A | NG |
| stability | 2,000 | G | G | G | A | G | G | G | NG | NG | NG |
| (pages) | 3,000 | G | G | G | A | A | G | G | NG | NG | NG |
| Decap | 1 | G | G | G | G | G | G | G | NG | NG | NG |
| (open) | 10 | G | G | G | A | A | G | G | NG | NG | NG |
| time (min) | 20 | G | G | G | A | A | G | G | NG | NG | NG |
| Legibility ($\Delta E^*_{ab}$) | | 26.2 | 12.0 | 17.8 | 30.8 | 27.3 | 24.9 | 25.8 | 24.2 | 26.8 | No Data[(a)] |

[(a)]Inkjet ink was not jettable

Similarly, inkjet inks in which the volatile organic solvent was replaced by a nonvolatile organic solvent (ISOPAR E) were highly unstable, with particle settling and defective jetting occurring at all tested decap and running stability intervals (Example 10). The stability of this ink was so poor that it was not jettable with the inkjet printhead, and thus the legibility could not be determined.

In terms of the silver nanoparticle loading, even low loadings (5 wt. % loading of silver nanoparticle dispersion; 2 wt. % active) were found to be sufficient for providing opaque printed images with acceptable legibility (Example 2, legibility score of 12.0). Increasing the silver nanoparticle loading to 30 wt. % of silver nanoparticle dispersion (12 wt. % active) provided the highest legibility score (30.8), but led to a slightly diminished running stability and decap performance, though both were still in the acceptable range (Example 4).

Regarding the amount of resin, inkjet inks formulated with 2 wt. % of either terpene resin or terpene phenol resin were found to be stable during prolonged printing operations and during print idle times (Examples 1-4 and 6-7). Higher loadings of terpene phenol resin, such as 4 wt. % in Example 5, also provided acceptable running stability and decap properties, although a 6 wt. % loading of the terpene phenol resin was found to be too high, resulting in degraded decap times and poor running stability after the first 1,000 pages (Example 9).

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. An inkjet ink, comprising:

(A) a resin, which is (A1) a terpene resin or (A2) a terpene phenol resin;

(B) a solvent system comprising (B1) a volatile organic solvent having a boiling point of less than 100° C.; and (C) silver nanoparticles, wherein the silver nanoparticles (C) are in a dispersion with a dispersant, and wherein the dispersant is a styrene/(poly)alkylene glycol (meth)acrylate/acrylic acid copolymer.

2. The inkjet ink of claim 1, wherein the resin (A) is present in an amount of 0.1 to 5 wt. %, based on a total weight of the inkjet ink.

3. The inkjet ink of claim 1, wherein the resin (A) is the terpene resin (A1).

4. The inkjet ink of claim 3, wherein the terpene resin (A1) is a homopolymer made from α-pinene.

5. The inkjet ink of claim 1, wherein the resin (A) is the terpene phenol resin (A2).

6. The inkjet ink of claim 5, wherein the terpene phenol resin (A2) has a hydroxyl value of 10 to 80 mgKOH/g.

7. The inkjet ink of claim 1, wherein the volatile organic solvent (B1) is present in an amount of 50 to 95 wt. %, based on a total weight of the inkjet ink.

8. The inkjet ink of claim 1, wherein the volatile organic solvent (B1) is an alcoholic solvent.

9. The inkjet ink of claim 1, wherein the volatile organic solvent (B1) is ethanol.

10. The inkjet ink of claim 1, wherein the volatile organic solvent (B1) is a ketone solvent.

11. The inkjet ink of claim 1, wherein the volatile organic solvent (B1) is methyl ethyl ketone.

12. The inkjet ink of claim 1, wherein the solvent system (B) further comprises (B2) a glycol ether.

13. The inkjet ink of claim 1, wherein the silver nanoparticles (C) are present in an amount of 0.5 to 15 wt. %, based on a total weight of the inkjet ink.

14. The inkjet ink of claim 1, wherein the silver nanoparticles (C) have an average particle size of less than 100 nm.

15. The inkjet ink of claim 1, further comprising (D) an alkanolamine, wherein the alkanolamine (D) is present in an amount of 0.1 to 10 wt. %, based on a total weight of the inkjet ink.

16. The inkjet ink of claim 15, wherein the alkanolamine (D) is at least one selected from the group consisting of ethanolamine, propanolamine, isopropanolamine, diethanolamine, and triethanolamine.

17. The inkjet ink of claim 1, further comprising (E) a silicone acrylate copolymer, wherein the silicone acrylate copolymer (E) is present in an amount of up to 5 wt. %, based on a total weight of the inkjet ink.

18. A printed article, comprising:

a substrate; and an opaque film disposed on the substrate, wherein the opaque film is formed from the inkjet ink of claim 1.

19. A method of forming an opaque printed image on a substrate, comprising:

applying the inkjet ink of claim 1 onto the substrate with a thermal inkjet printhead; and drying the inkjet ink, thereby converting the inkjet ink into an opaque film forming the opaque printed image.

* * * * *